(12) United States Patent
Narita

(10) Patent No.: US 11,393,124 B2
(45) Date of Patent: Jul. 19, 2022

(54) INFORMATION PROCESSING APPARATUS, INFORMATION PROCESSING METHOD, AND PROGRAM

(71) Applicant: SONY CORPORATION, Tokyo (JP)

(72) Inventor: Gaku Narita, Kanagawa (JP)

(73) Assignee: SONY CORPORATION, Tokyo (JP)

(*) Notice: Subject to any disclaimer, the term of this patent is extended or adjusted under 35 U.S.C. 154(b) by 49 days.

(21) Appl. No.: 16/976,719

(22) PCT Filed: Feb. 20, 2019

(86) PCT No.: PCT/JP2019/006202
§ 371 (c)(1),
(2) Date: Aug. 28, 2020

(87) PCT Pub. No.: WO2019/171944
PCT Pub. Date: Sep. 12, 2019

(65) Prior Publication Data
US 2020/0410714 A1  Dec. 31, 2020

(30) Foreign Application Priority Data
Mar. 6, 2018 (JP) .............................. JP2018-039313

(51) Int. Cl.
*G06T 7/73* (2017.01)
*G06K 9/62* (2022.01)
(Continued)

(52) U.S. Cl.
CPC .............. *G06T 7/75* (2017.01); *G06K 9/6256* (2013.01); *G06N 3/08* (2013.01); *G06T 7/60* (2013.01); *G06T 2207/20081* (2013.01)

(58) Field of Classification Search
None
See application file for complete search history.

(56) References Cited

U.S. PATENT DOCUMENTS

2018/0268601 A1* 9/2018 Rad .......................... G06T 7/75

FOREIGN PATENT DOCUMENTS

| JP | 2006-190078 A | 7/2006 |
| JP | 2016-071547 A | 5/2016 |

(Continued)

OTHER PUBLICATIONS

Teodora Vatahska et al., Feature-based Head Pose Estimation from Images, 2007 7th IEEE-RAS International Conference on Humanoid Robots, Nov. 29-Dec. 1, 2007, pp. 330-335, IEEE.

(Continued)

*Primary Examiner* — Leon Flores
(74) *Attorney, Agent, or Firm* — Paratus Law Group, PLLC

(57) ABSTRACT

There is provided an information processing apparatus, an information processing method, and a program that are capable of easily predicting the posture of an object. An information processing apparatus according to an aspect of the present technology specifies, on the basis of learned data used in specifying corresponding points, obtained by performing learning using data of a predetermined portion that has symmetry with respect to other portions of an entire model that represents an object as a recognition target, second points on the model included in an input scene that correspond to first points on the model, as the corresponding points, and predicts the posture of the model included in the scene on the basis of the corresponding points. The present technology is applicable to an apparatus for controlling a projection system to project images according to projection mapping.

16 Claims, 21 Drawing Sheets

(51) Int. Cl.
*G06N 3/08* (2006.01)
*G06T 7/60* (2017.01)

(56) References Cited

FOREIGN PATENT DOCUMENTS

| | | |
|---|---|---|
| JP | 2016-207147 A | 12/2016 |
| JP | 2018-028774 A | 2/2018 |

OTHER PUBLICATIONS

Ang Liu et al., Fast Facial Landmark Detection Using Cascade Classifiers and a Simple 3D Model, 2011 18th IEEE International Conference on Image Processing, Sep. 11-14, 2011, pp. 845-848, IEEE.

* cited by examiner

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2019/006202 (filed on Feb. 20, 2019) under 35 U.S.C. § 371, which claims priority to Japanese Patent Application No. 2018-039313 (filed on Mar. 6, 2018), which are all hereby incorporated by reference in their entirety.

TECHNICAL FIELD

The present technology relates to an information processing apparatus, an information processing method, and a program, and more particularly to an information processing apparatus, an information processing method, and a program that are capable of easily predicting the posture of an object.

BACKGROUND ART

There is a technology for recognizing a pre-registered object on the basis of images captured by a camera and point group data representing distances measured by a ranging sensor, and predicting the posture of the object.

Such a technology for posture prediction is used in a PM (Projection Mapping) system having a plurality of projectors interlinked to project an image onto an object, for example. Processing sequences for changing the content of the projected image and correcting the projected image are carried out on the basis of the predicted posture of the object.

CITATION LIST

Patent Literature

[PTL 1]
  JP2016-207147A

SUMMARY

Technical Problem

The posture of an object is predicted by specifying a point on the object that is pre-registered which corresponds to a certain point on the object included in a captured image, and using the relationship between these corresponding points as a basis. The corresponding points used to predict the posture are specified by extracting the feature quantities of points on the object included in the image and performing matching between the extracted feature quantities and learned feature quantities.

In a case where an object to be recognized has symmetry, there exist a number of points as candidates for a corresponding point that corresponds to a certain point on the object included in a captured image, resulting in a longer computational time for matching. A point at a certain position on the object and a point at a symmetrical position thereon are represented by the same feature quantities, and data of the feature quantities are overlappingly stored in a dictionary.

The present technology has been developed under the circumferences described above, and is aimed at easily predicting the posture of an object.

Solution to Problem

An information processing apparatus according to an aspect of the present technology includes a corresponding point acquiring section that specifies, on the basis of learned data used in specifying corresponding points, obtained by performing learning using data of a predetermined portion that has symmetry with respect to other portions of an entire model that represents an object as a recognition target, second points on the model included in an input scene that correspond to first points on the model, as the corresponding points, and a posture predicting section that predicts a posture of the model included in the scene on a basis of the corresponding points.

An information processing apparatus according to another aspect of the present technology includes a generator that generates, when a posture of a model included in an input scene is to be predicted by performing learning using data of a predetermined portion that has symmetry with respect to other portions of the entire model that represents an object as a recognition target, the learned data used in specifying second points on the model included in the scene that correspond to first points on the model, as corresponding points.

According to an aspect of the present technology, on the basis of learned data used in specifying corresponding points, obtained by performing learning using data of a predetermined portion that has symmetry with respect to other portions of an entire model that represents an object as a recognition target, second points on the model included in an input scene that correspond to first points on the model are specified as the corresponding points, and the posture of the model included in the scene is predicted on the basis of the corresponding points.

According to another aspect of the present technology, when a posture of a model included in a scene is to be predicted by performing learning using data of a predetermined portion that has symmetry with respect to other portions of the entire model that represents an object as a recognition target, the learned data used in specifying second points on the model included in the scene that correspond to first points on the model as corresponding points are generated.

Advantageous Effect of Invention

According to the present technology, it is possible to easily predict the posture of an object.

The advantages referred to herein are not necessarily restrictive, but any of the advantages referred to in the present description may be applicable.

DESCRIPTION OF EMBODIMENT

Modes for carrying out the present technology will hereinafter be described below. The description will be given in the following order:

1. Regarding a projection system
1-1. Configuration of a projection system
1-2. Regarding general posture prediction
2. Regarding posture prediction to which the present technology is applied
2-1. Example using feature quantities
2-2. Example using machine learning
3. Modifications <<1. Regarding a Projection System>>
<1-1. Configuration of a Projection System>

Figure 1:
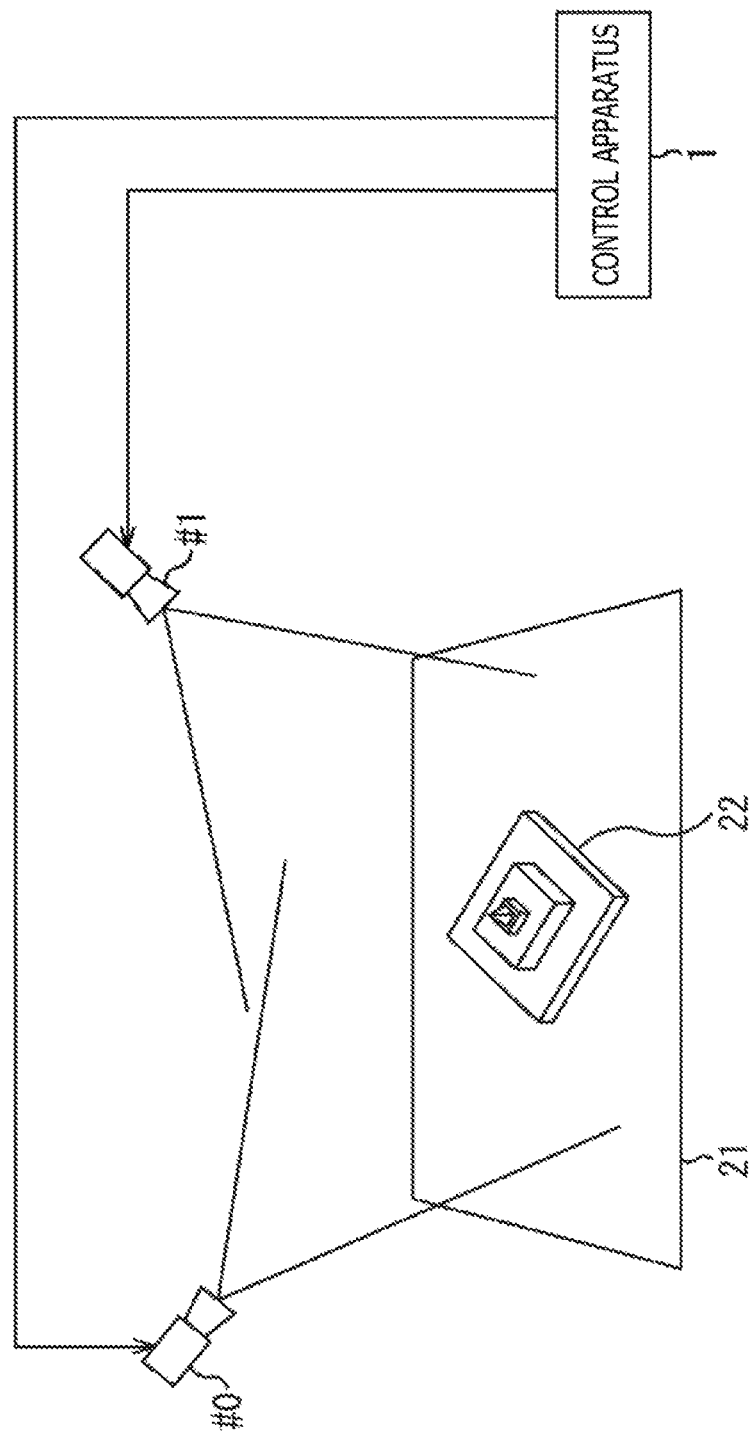
FIG. 1 is a diagram illustrating a configurational example of a projection system according to an embodiment of the present technology.

FIG. 1 is a diagram illustrating a configurational example of a projection system according to an embodiment of the present technology.

The projection system illustrated in FIG. 1 includes projectors #0 and #1 connected to a control apparatus 1 through wired or wireless communication. The projectors #0 and #1 are installed above a projection space with their projecting directions toward an object 22. The projectors #0 and #1 may be installed in positions other than the positions above the projection space.

The control apparatus 1 is constructed as an apparatus such as a personal computer, a smartphone, or a tablet terminal. The control apparatus 1 includes an apparatus for controlling the projection of images by projectors #0 and #1.

The projectors #0 and #1 emits projection light representing predetermined images under the control of the control apparatus 1.

In the projection system illustrated in FIG. 1, images are projected onto the object 22 placed on a floor 21 using the projectors #0 and #1. The image by the projection light emitted from the projector #0 is mainly projected onto a position on the left side of the object 22, and the image by the projection light emitted from the projector #1 is mainly projected onto a position on the right side of the object 22.

Onto the object 22, there are projected texture images rendered to represent the texture of the surface of the object 22, for example, texture of metal or texture of wood. Images may be projected not only to represent textures, but also to present various pieces of information and to produce three-dimensional effects.

In addition, the projectors #0 and #1 project various images such as images for displaying characters at positions around the object 22 on the floor 21.

The projection system illustrated in FIG. 1 thus includes a PM (Projection Mapping) system for projecting images onto the surface of the object 22 that has a three-dimensional shape. Images may be projected onto an object having a planar shape, rather than an object having a three-dimensional shape.

Figure 2:
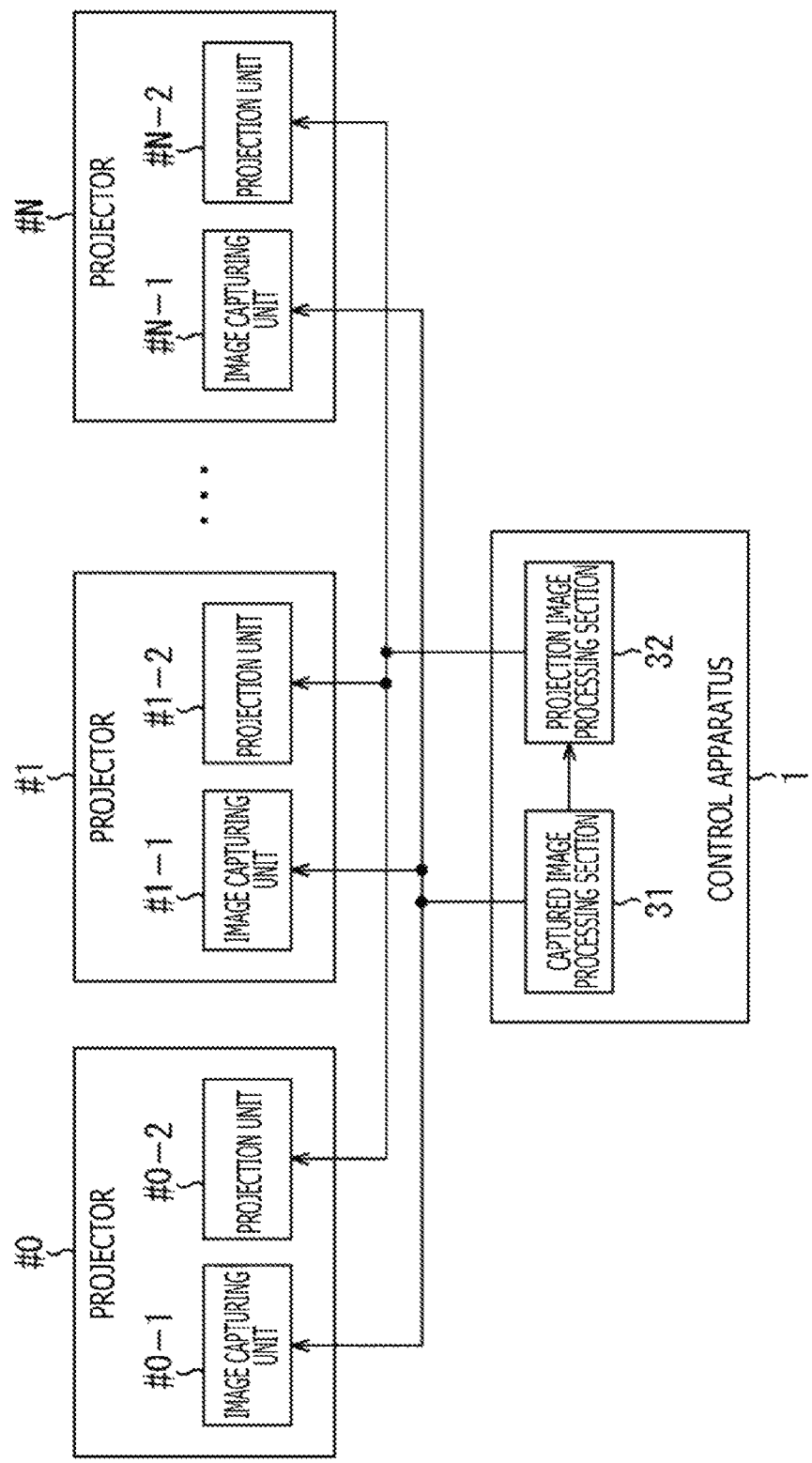
FIG. 2 is a block diagram illustrating the configurational example of the projection system.

FIG. 2 is a block diagram illustrating the configurational example of the projection system.

In the example illustrated in FIG. 2, other projectors than the projectors #0 and #1 are illustrated. Two or more projectors may thus be included. Each of the projectors #0 through #N includes an image capturing unit including a camera, in addition to a projection unit including a display device, a lens, a light source, and the like.

The image capturing unit #0-1, of the projector #0, for example, captures an image of the state of the projection space including the object 22. The image captured by the image capturing unit #0-1 is supplied to the control apparatus 1.

The projection unit #0-2, projects a projection image assigned to the projector #0 under the control of the control apparatus 1.

Each of the image capturing units #1-1 through #N−1, of the projectors #1 through #N also captures an image of the state of the projection space. Each of the projection units #1-2 through #N−2, also projects a projection image assigned to its own projector.

In the example illustrated in FIG. 2, the number of the projection units and the number of the image capturing units are the same as each other. However, the numbers may be different from each other. Alternatively, the image capturing units may not be incorporated in the projectors, but may be installed in remote positions. The configuration of the control apparatus 1 may be included in the projectors.

The control apparatus 1 includes a captured image processing section 31 and a projection image processing section 32.

The captured image processing section 31 predicts the posture of the object 22 on the basis of the images captured by the image capturing units of the respective projectors. Information for recognizing the object 22 included in the captured images and predicting the posture has been made ready for the control apparatus 1. The captured image processing section 31 outputs information representing the result of the prediction of the posture of the object 22 to the projection image processing section 32.

The projection image processing section 32 generates projection images to be projected from the respective projectors onto the object 22 as a projection target. The projection image processing section 32 appropriately performs a process of changing the contents of the images to projected and correcting the images to be projected on the basis of the posture of the object 22 that has been predicted by the captured image processing section 31.

The control apparatus 1 thus includes an information processing apparatus having a function to recognize the pre-registered object 22 on the basis of the images captured by the cameras and to predict the posture of the object 22. The posture of the object may not be predicted on the basis of the images captured by the cameras, but may be predicted on the basis of various inputs such as of point group data representing distances measured by a ranging sensor.

The posture predicting function of the control apparatus 1 will hereinafter be described below.

An object as a registered recognition target will hereinafter be referred to as "model" as required. Data of the model input as a registered recognition target, such as image data, point group data representing distances, etc. will be referred to as "scene." A scene represents a model having a certain posture.

The relationship between a model and the posture of the model included in the scene thereof may be represented by a two-dimensional or three-dimensional rigid transformation or a holographic transformation.

<1-2. Regarding General Posture Prediction>

Figure 3:
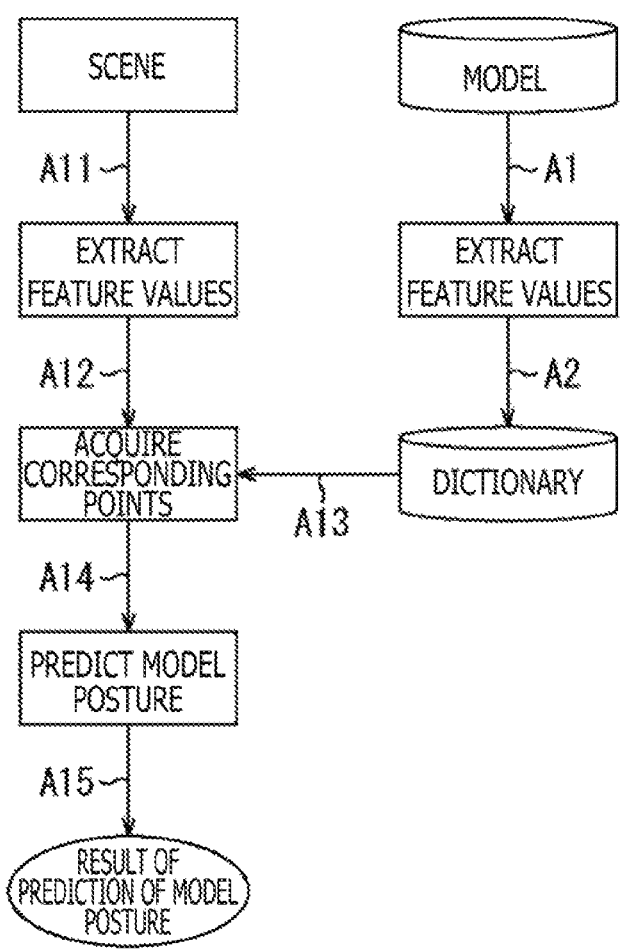
FIG. 3 is a diagram illustrating the flow of a general method of predicting the posture of a model.

FIG. 3 is a diagram illustrating the flow of a general method of recognizing a model included in a scene and predicting the posture of the model.

First, as pointed by the tip of the arrow A1, feature quantities are extracted from the entire model. Data of the extracted feature quantities are stored as data representing a dictionary pointed by the tip of the arrow A2.

In a case where an image is input, for example, SIFT, SURF, and ORB are used as feature quantities. Moreover, in a case where a point group representing distances is input, SHOT, FPFH, and PPE are used as feature quantities. SIFT, SURF, and ORB are described respectively in the documents [1] through [3] illustrated below. SHOT, FPFH, and PPE are described respectively in the documents [4] through [6] illustrated below.

[1] Lowe, David G. "Object recognition from local scale-invariant features." Computer vision, 1999. The proceedings of the seventh IEEE international conference on. Vol. 2. Ieee, 1999.

[2] Bay, Herbert, Tinne Tuytelaars, and Luc Van Gool. "Surf: Speeded up robust features." Computer vision-ECCV 2006 (2006): 404-417.

[3] Rublee, Ethan, et al. "ORB: An efficient alternative to SIFT or SURF." Computer Vison (ICCV), 2011 IEEE international conference on. IEEE, 2011.

[4] Tombari, Federico, Samuele Salti, and Luigi Di Stefano. "Unique signatures of histograms for local surface description." European conference on computer vision. Springer, Berlin, Heidelberg, 2010.

[5] Rusu, Radu Bogdan, Nico Blodow and Michael Beets. "Fast point feature histograms (FPFH) for 3D registration." Robotics and Automation, 2009. ICRA'09. IEEE International Conference on. IEEE, 2009.

[6] Drost, Bertram, et al. "Model globally, match locally: Efficient and robust 3D object recognition." Computer Vision and Pattern. Recognition (CVPR), 2010 IEEE Conference on. Ieee, 2010.

At the time of execution of posture prediction, feature quantities are extracted from the scene, as pointed by the tip of the arrow A11. As pointed by the tips of the arrows A12 and A13, matching between the feature quantities extracted from the scene and the feature quantities stored in the dictionary is performed, and corresponding points on the model and the model included in the scene are acquired. For example, a plurality of points on the model and a plurality of points, corresponding to those points, on the model included in the scene are acquired.

As pointed by the tip of the arrow A14, posture hypotheses for the model included in the scene are calculated on the basis of the relationship between the corresponding points are calculated, and the posture hypothesis that best matches the conditions is output as the result of the prediction of the posture, as pointed by the tip of the arrow A15.

Figure 4:
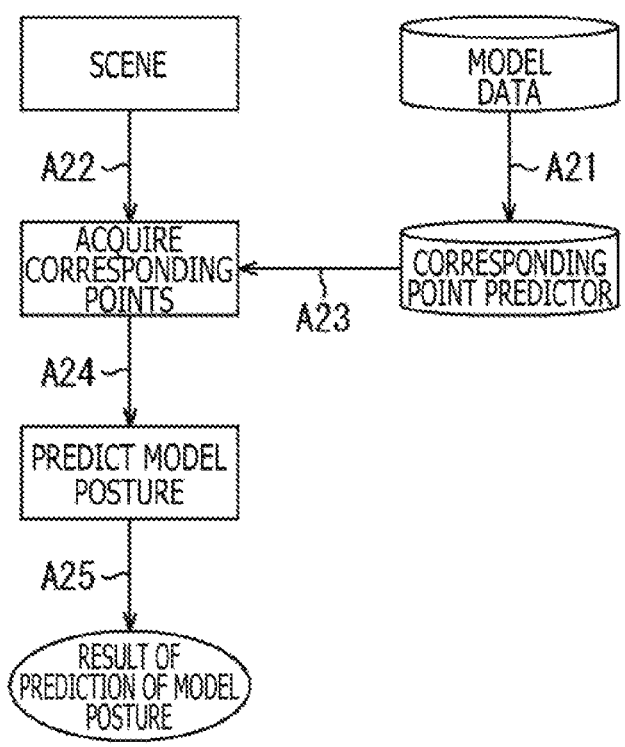
FIG. 4 is a diagram illustrating the flow of another general method of predicting the posture of a model.

FIG. 4 is a diagram illustrating the flow of another general method of predicting the posture of a model.

The posture prediction illustrated in FIG. 4 refers to a process using machine learning.

First, as pointed by the tip of the arrow A21, a corresponding point predictor that has learned the relationship between corresponding points is generated. Here, a predictor that outputs corresponding points when a scene is input is generated as a corresponding point predictor. The corresponding point predictor is configured as a predictor of Random Forest, a predictor of Random Ferns, or a neural network.

At the time of execution of posture prediction, corresponding points on the model and the model included in the scene are acquired by using the scene as the input to the corresponding point predictor, as pointed by the tips of the arrows A22 and A23.

As pointed by the tip of the arrow A24, posture hypotheses for the model included in the scene are calculated on the basis of the relationship between the corresponding points are calculated, and the posture hypothesis that best matches the conditions is output as the result of the prediction of the posture, as pointed by the tip of the arrow A25.

Figure 5:
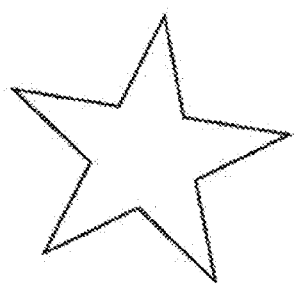
FIG. 5 is a diagram illustrating an example of a model.
Figure 5:
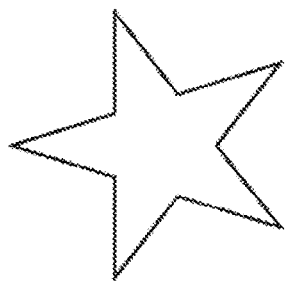

FIG. 5 is a diagram illustrating an example of a model.

It is assumed hereinafter that the model is a planar object as illustrated in FIG. 5 and a star-shaped object with five vertexes disposed at equal spaced intervals. In the example illustrated in FIG. 5, the posture of the model and the posture of the model included in the scene are not identical to each other. The posture of the model included in the scene is predicted on the basis of learned data generated beforehand by performing a learning process using the data of the model.

Here, the model illustrated in FIG. 5 has symmetry.

Therefore, in the case of the predicting method using the feature quantities illustrated in FIG. 3, data of feature quantities having identical or essentially identical values, calculated from different positions on the model, are overlappingly stored in the dictionary. For example, since portions of the model in the vicinity of the respective vertexes are identical in shape in terms of the shape only, they are represented by the same feature quantities.

Figure 6:
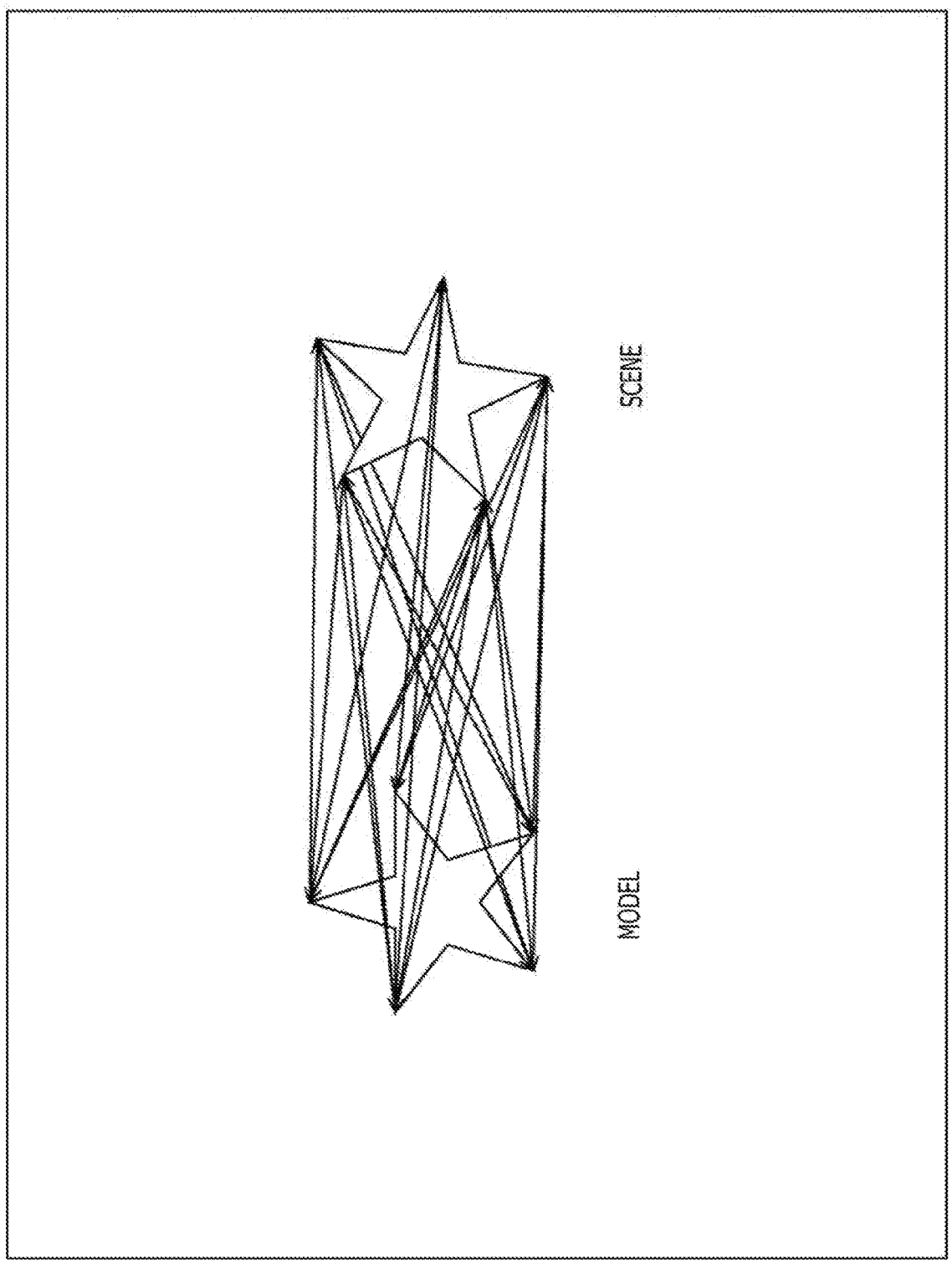
FIG. 6 is a diagram illustrating an example of matching between corresponding points.

As a result, at the time of execution of posture prediction, as illustrated in FIG. 6, computation arises for performing matching between points in the scene and a number of points on the model, resulting in a longer computational time. Furthermore, as the points in the scene are associated with a plurality of points on the model, the final result of the prediction of the posture becomes unstable.

On the other hand, in the case of the predicting method using the machine learning illustrated in FIG. 4 the learning of a posture predictor becomes unstable.

For example, posture prediction in a case where a model has symmetry is described in the following document [7]:

[7] de Figueiredo, Rui Pimentel, Plinio Moreno, and Alexandre Bernardino. "Fast 3D object recognition of rotationally symmetric objects." Iberian Conference on Pattern Recognition and Image Analysis. Springer, Berlin, Heidelberg, 2013.

The technology described in the document [7] performs three-dimensional object recognition of rotational bodies using PPF extracted from a point group (the document. [6]). This technology is applicable only where the input is a point group and PPF is used as feature quantities in addition, the technology is not applicable to the recognition of objects that has any symmetry, other than rotational bodies.

The control apparatus 1 is able to predict the posture of objects that have any symmetry, other than rotational bodies.

<<2. Regarding Posture Prediction to Which the Present Technology is Applied>>

<2-1. Example Using Feature Quantities>

Figure 7:
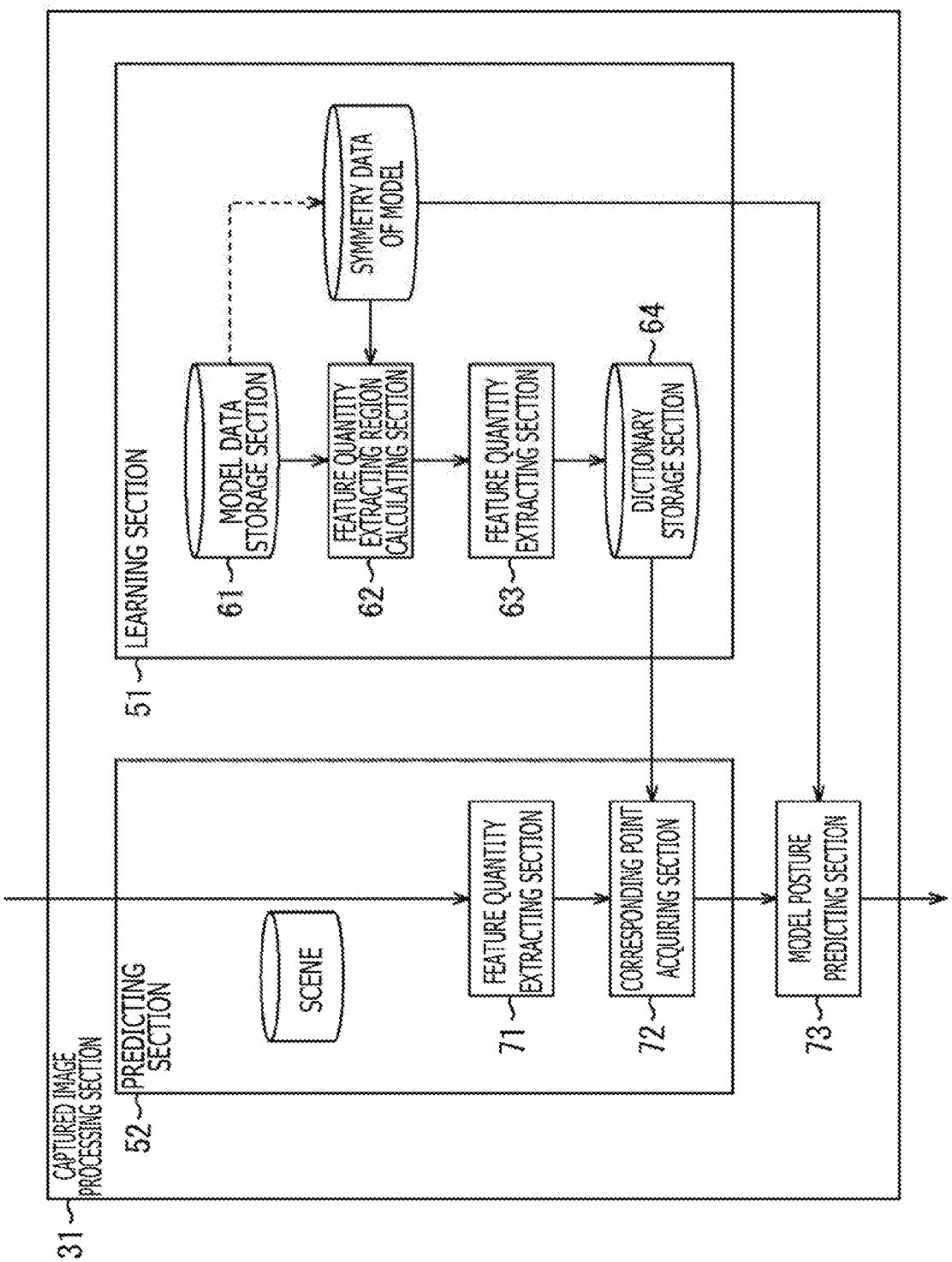
FIG. 7 is a block diagram illustrating a configurational example of a captured image processing section.

FIG. 7 is a block diagram illustrating a configurational example of the captured image processing section 31.

As illustrated in FIG. 7, the captured image processing section 31 includes a learning section 51 and a predicting section 52.

The learning section 51 functions as a generator that performs learning based on the data of a model and generates a dictionary used in acquiring corresponding points. The learning section 51 includes a model data storage section 61, a feature quantity extracting region calculating section 62, a feature quantity extracting section 63, and a dictionary storage section 64.

The model data storage section 61 stores the data of the model. The data of the model stored by the model data storage section 61 include data regarding the texture and shape (at least either one of the texture or the shape) of the model, and data regarding the symmetry of the model. As pointed by the tip of the broken-line arrow, the data regarding the symmetry of the model are supplied to the feature quantity extracting region calculating section 62 at the time of learning and also supplied to a model posture predicting section 73 of the predicting section 52 at the time of posture prediction.

Here, in a case where a coordinate transformation is performed on a model M, the symmetry of the model is represented as a set of coordinate transformations $\{T_i\}$ such that the model M that has been transformed coincides with the model M prior to being transformed. In a case where the transformed model M on which the coordinate transformations $\{T_i\}$ have been performed are identical to the model M prior to being transformed in terms of the texture and shape, the model M has symmetry.

Figure 8:
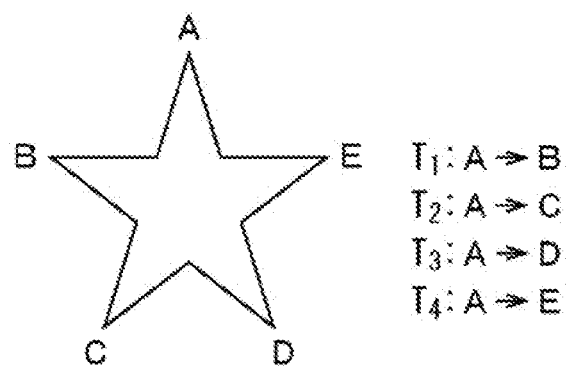
FIG. 8 is a diagram illustrating an example of a coordinate transformation of a model.

If it is assumed that the vertexes of a model are indicated by A through E, respectively, as illustrated in FIG. 8, then $\{T_i\}$ represents a set of four coordinate transformations including a coordinate transformation $T_1$ for transferring the vertex. A to the vertex B, coordinate transformation $T_2$ for transferring the vertex A to the vertex C, a coordinate transformation $T_3$ for transferring the vertex A to the vertex D, and a coordinate transformation $T_4$ for transferring the vertex A to the vertex E.

$\{T_i\}$ may be a finite set or an infinite set. The data regarding the symmetry of the model may be input by the user of the control apparatus 1 or may be automatically predicted by the control apparatus 1 on the basis of the data regarding the texture and shape of the model.

The feature quantity extracting region calculating section 62 calculates a partial region that represents the region of a portion, as a target where feature quantities are to be extracted, of the entire surface of the model. The partial region is calculated (established) by referring to the data regarding the symmetry of the model.

Specifically, the feature quantity extracting region calculating section 62 establishes a partial region $S_0$ that satisfies a condition according to the equation (1) below and a condition according to the equation (2) below.

[Math. 1]

$$S_0 \cap T_i S_0 = \emptyset (\forall i) \quad (1)$$

[Math. 2]

$$\bigcup_i T_i S_0 \cup S_0 = S_M \quad (2)$$

The equation (1) represents a condition for requesting that no matter what coordinate transformations $T_i$ are performed on the partial region $S_0$, the transformed partial region $S_0$ should not overlap the partial region $S_0$ prior to being transformed.

The equation (2) represents a condition for requesting that the union of transformed regions after coordinate transformations $T_i$ have been performed on the partial region $S_0$ should cover the entire surface of the model M. $S_M$ represents the entire surface of the model M. In a case where i=1, 2, 3, 4, the equation (2) is expressed as the equation (3) below,

[Math. 3]

$$T_1 S_0 \cup T_2 S_0 \cup T_3 S_0 \cup T_4 S_0 \cup S_0 = S_M \quad (3)$$

Figure 9:
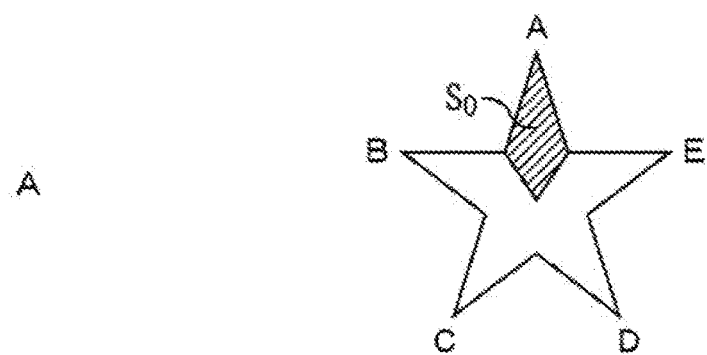
FIG. 9 is a diagram illustrating an example of a calculation of a partial region.
Figure 9:
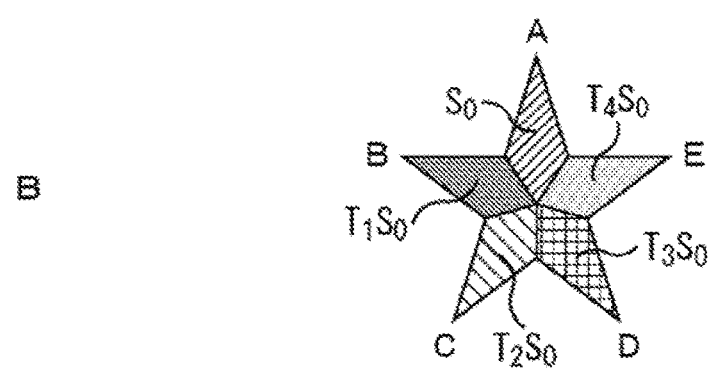

FIG. 9 is a diagram illustrating an example of a calculation of the partial region $S_0$.

No matter what coordinate transformations $T_i$ (i=1, 2, 3, 4) are performed on the partial region $S_0$ that is illustrated with oblique lines in A of FIG. 9, the transformed partial regions do not overlap the partial region $S_0$ itself. Therefore, the partial region $S_0$ can be said to satisfy the condition of the equation (1).

Furthermore, the union of the partial region $S_0$ itself and the regions $T_1 S_0$, $T_2 S_0$, $T_3 S_0$, and $T_4 S_0$ generated by coordinate transformations $T_i$ (i=1, 2, 3, 4) covers the model M in its entirety. Therefore, the partial region $S_0$ can be said to satisfy the condition of the equation (2).

Of the data of the entire model, the data of the partial region $S_0$ thus calculated are supplied from the feature quantity extracting region calculating section 62 to the feature quantity extracting section 63.

The feature quantity extracting section 63 extracts feature quantities of points in the partial region $S_0$. The data of the extracted feature quantities in the partial region $S_0$ are supplied to the dictionary storage section 64, and stored as data of a dictionary therein.

In a case where a region of a model having symmetry is shifted to the position of another portion having symmetry by way of a coordinate transformation in view of the symmetry of the model and the region does not overlap any regions generated after coordinate transformations, the region is established as the partial region $S_0$. In this manner, it is possible to prevent data of similar feature quantities from being overlappingly stored in a dictionary.

Figure 10:
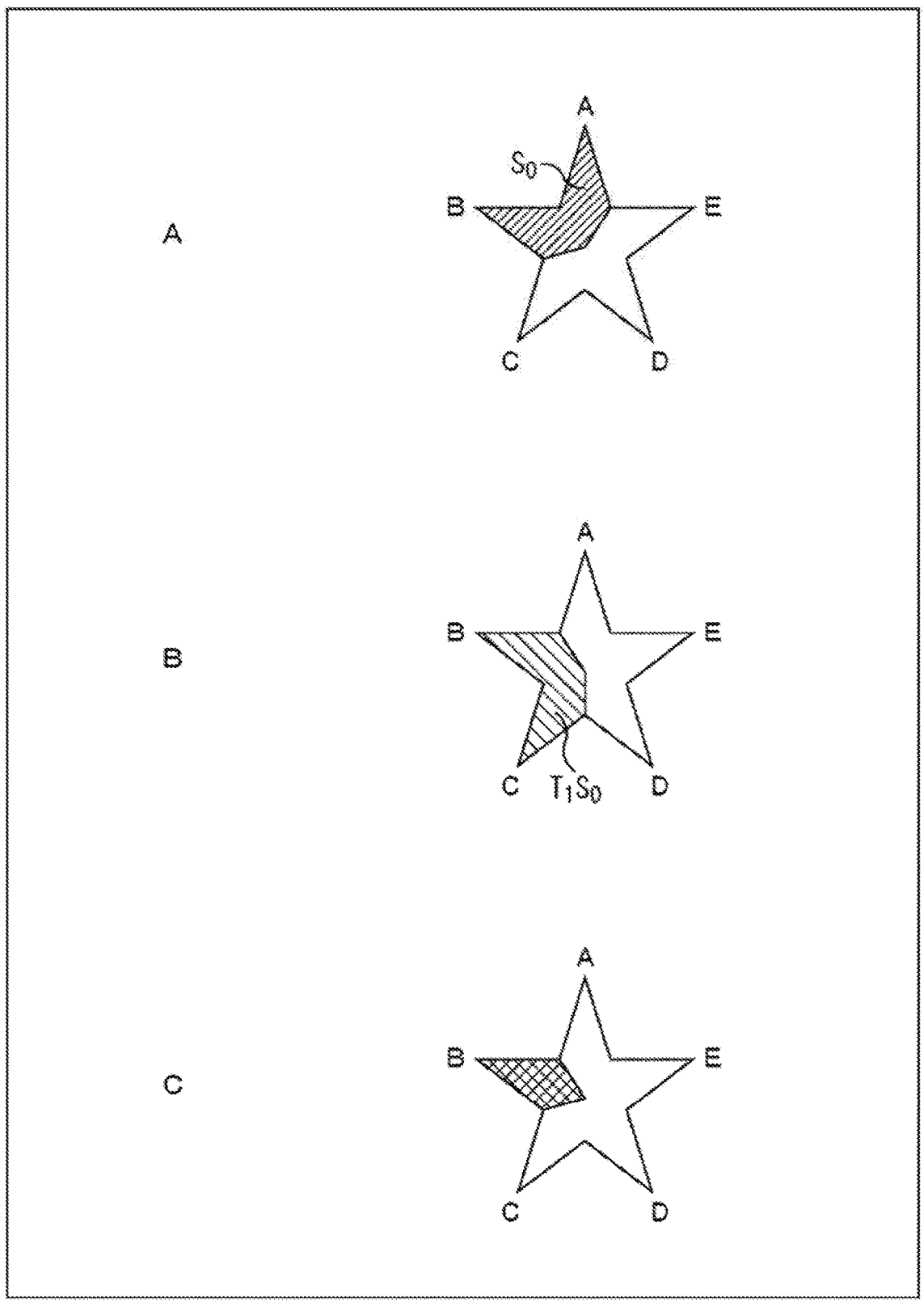
FIG. 10 is a diagram illustrating an example of a calculation of a partial region.

It is hypothetically supposed that a partial region $S_0$ shaped as illustrated in A of FIG. 10 has been established. In this case, the partial region $S_0$ overlaps a region $T_1 S_0$ transformed by a coordinate transformation $T_1$ as illustrated in B of FIG. 10, and feature quantities of a region illustrated with oblique lines in C of FIG. 10 are overlappingly stored in a dictionary. By establishing the partial region $S_0$ that satisfies the condition of the equation (1), it is possible to prevent data of the feature quantities of such an overlapping region from being stored in the dictionary.

Moreover, in order to predict a posture correctly, it is desirable to have ready feature quantities regarding many points acting as corresponding points. In a case where a region of a model having symmetry is shifted to the position of another portion having symmetry by way of a coordinate transformation in view of the symmetry of the model, by establishing a partial region $S_0$ corresponding to the entire model, it is possible to predict the posture using many corresponding points.

Figure 11:
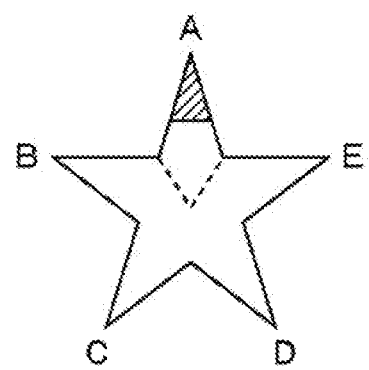
FIG. 11 is a diagram illustrating an example of a calculation of a partial region.

It is hypothetically supposed that a partial region $S_0$ illustrated with oblique lines in FIG. 11 has been established. In this case, although the partial region $S_0$ satisfies the condition of the equation (1), the number of points where feature quantities are obtained is few compared with the case in which the partial region $S_0$ is established as illustrated in FIG. 9. By establishing the partial region $S_0$ in order to satisfy the condition of the equation (2), it is possible to have ready feature quantities regarding many points acting as corresponding points.

By establishing a partial region $S_0$ so as to satisfy both the conditions of the equation (1) and the equation (2), it is possible to extract necessary and sufficient feature quantities taking into account symmetry.

Referring back to FIG. 7, the predicting section 52 refers to the dictionary obtained from the learning performed by the learning section 51 and predicts the posture of the model included in the scene. The predicting section 52 includes a feature quantity extracting section 71, a corresponding point acquiring section 72, and the model posture predicting section 73.

The feature quantity extracting section 71 extracts feature quantities of the entire scene, and outputs the extracted feature quantities to the corresponding point acquiring section 72.

The corresponding point acquiring section 72 performs matching between the feature quantities of the partial region $S_0$ stored in the dictionary and the feature quantities of the entire scene, and acquires points on the model included in the scene that correspond to the points on the model, as corresponding points.

Figure 12:
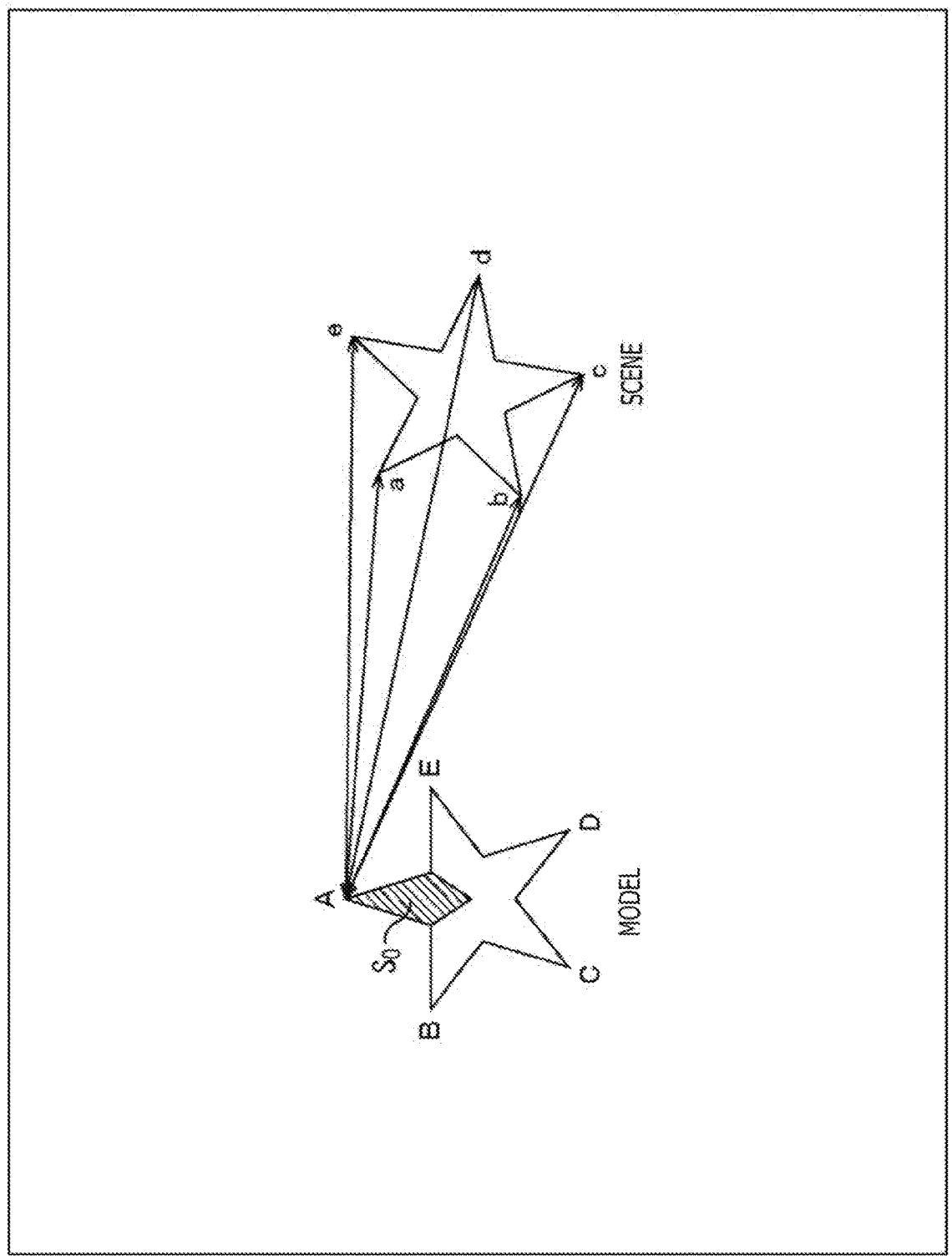
FIG. 12 is a diagram illustrating an example of matching between corresponding points.

FIG. 12 is a diagram illustrating an example of corresponding points.

At the time of learning, as the feature quantities in the partial region $S_0$ illustrated in a left side of FIG. 12 have been obtained, a vertex a, a vertex b, a vertex c, a vertex d, and a vertex e are acquired as corresponding points that correspond to the vertex A on the model, as illustrated in FIG. 12. Since the feature quantities used for matching are few, it is possible to reduce the computational time required for matching, compared with the case in which matching is performed between the feature quantities of the entire model as described with reference to FIG. 6.

Information of the corresponding points thus acquired is supplied to the model posture predicting section 73.

The model posture predicting section 73 establishes posture hypotheses as candidates for the posture of the model included in the scene on the basis of the corresponding points acquired by the corresponding point acquiring section 72. For example, posture hypotheses are established on the basis of the relationship between points on the model and points on the model included in the scene. There are established a plurality of posture hypotheses, for example.

Furthermore, the model posture predicting section 73 selects one of the posture hypotheses as a final posture and outputs the selected posture as the result of the prediction.

The model posture predicting section 73 selects the final posture by referring to the data regarding the symmetry of the model.

The final posture is selected according to robust prediction such as RANSAC (Random Sampling Consensus) or posture clustering. The robust prediction refers to a process for predicting a posture taking into account the possibility that an outlier may be included in given observation values.

First, general posture prediction according to RANSAC will be described below. The general posture prediction described herein refers to predicting a posture without taking into account the symmetry of the model.

RANSAC represents a method of repeating a process for defining reliability s(h) with respect to posture hypotheses h and selecting a posture hypothesis h whose value of reliability s(h) is large from a group of posture hypotheses. The reliability s(h) is represented by the equation (4) below, for example. The equation (4) is an equation for defining reliability depending on the number of inliers.

[Math. 4]

$$s(h) = \sum_{p_s} 1\left(\min_{p_m} d(hp_m, p_s) < \sigma\right) \quad (4)$$

Here, $p_m$ indicates a point on the model and $p_s$ indicates a point on the scene (a point on the model included in the scene). $p_m$ and $p_s$ are acquired as corresponding points by the corresponding point acquiring section 72. d(p,q) represents a function for defining the distance between the point p and the point q. A Euclidean distance, for example, is used as the distance between the point p and the point q. The Euclidean distance is represented by the equation (5) below.

[Math. 5]

$$d(p,q) = \|p-q\|_2 \quad (5)$$

In the equation (4), σ represents a predetermined threshold value. Moreover, 1(•) represents a function that takes the value 1 in a case where the condition in the parentheses is fulfilled and that takes the value 0 otherwise.

According to the equation (4), a value of 1 is established in a case where the minimum value of the distance between a point $hp_m$ on the scene at the time the posture hypothesis h is given to a point $p_m$ on the model and a point $p_s$ on the scene which corresponds to the point $p_m$ is smaller than the threshold value σ. Furthermore, the sum of established values at the time such a value is established with respect to all points $p_s$ is determined as reliability s(h).

Figure 13:
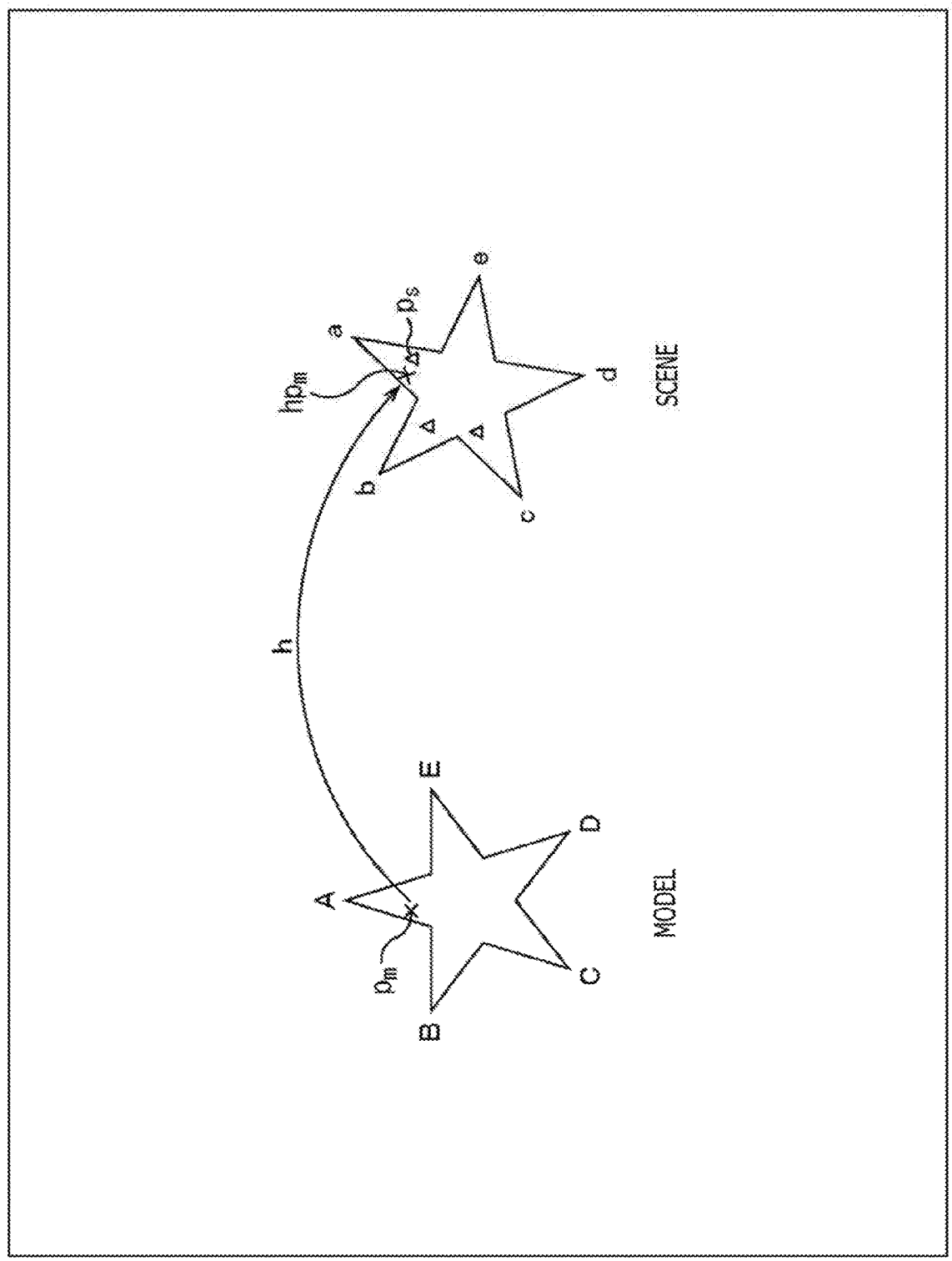
FIG. 13 is a diagram illustrating an example of computation of an established value.

FIG. 13 is a diagram illustrating an example of computation of an established value.

In a case where the posture hypothesis h is given to a point $p_m$ on the model as indicated by the solid-line arrow, the point $p_m$ on the model is represented as a point $hp_m$ on the scene. The minimum distance of the distances between the point $hp_m$ on the scene and a plurality of points $p_s$ as corresponding points is compared with the threshold value σ, thereby providing an established value. In the example illustrated in FIG. 13, outlined triangles indicated on the scene represent respective points $p_s$ as corresponding points.

Next, general posture prediction according to posture clustering will be described below.

The posture clustering calculates the final posture of the model by grouping posture hypotheses whose degrees of similarity are high among a group of posture hypotheses.

The degree of similarity $l(h_1, h_2)$ between two posture hypotheses $h_1$ and $h_2$ is represented by the equation (6) below. The equation (6) is an equation for defining the degree of similarity with a translational component and a rotational component.

[Math. 6]

$$l(h_1,h_2)=1(\text{trans}(h_1^{-1}h_2)<\sigma_t \wedge \text{angle}(h_1^{-1}h_2)<\sigma_r) \qquad (6)$$

Here, trans(h) represents the magnitude of the translational component of the posture hypotheses h and angle(h) represents the magnitude of the rotational component of the posture hypotheses h. $\sigma_t$ and $\sigma_r$ represent predetermined threshold values.

In a case where the value of the translational component is smaller than the threshold value $\sigma_t$ and the value of the rotational component is smaller than the threshold value $\sigma_r$, the degree of similarity $l(h_1, h_2)$ takes a value of 1.

The model posture predicting section 73 of the predicting section 52 performs such RANSAC and posture clustering while taking into account the symmetry of a model. As described above, the symmetry of the model is represented by $\{T_i\}$. By taking into account the symmetry $\{T_i\}$ of the model, posture hypotheses that are essentially similar to each other are handled as equivalent posture hypotheses though their values are different.

In a case where the symmetry of the model is taken into account in RANSAC, the above equation (4) that defines the reliability s(h) is changed to the equation (7) below.

[Math. 7]

$$s'(h) = \sum_{p_s} 1\left(\min_{p_m} \min_{T_i} d(T_i h p_m, p_s) < \sigma\right) \qquad (7)$$

In the equation (7), the symmetry $\{T_i\}$ of the model is used in computing the point $hp_m$ on the scene at the time the posture hypothesis h is given to the point $p_m$ on the model. A value of 1 is established in a case where the minimum value of the distance between the point $T_i hp_m$ on the scene using the symmetry $\{T_i\}$ of the model and the point $p_s$ on the scene which corresponds to the point $p_m$ is smaller than the threshold value $\sigma$. Furthermore, the sum of established values at the time such a value is established with respect to all points $p_s$ is determined as reliability s'(h).

Figure 14:
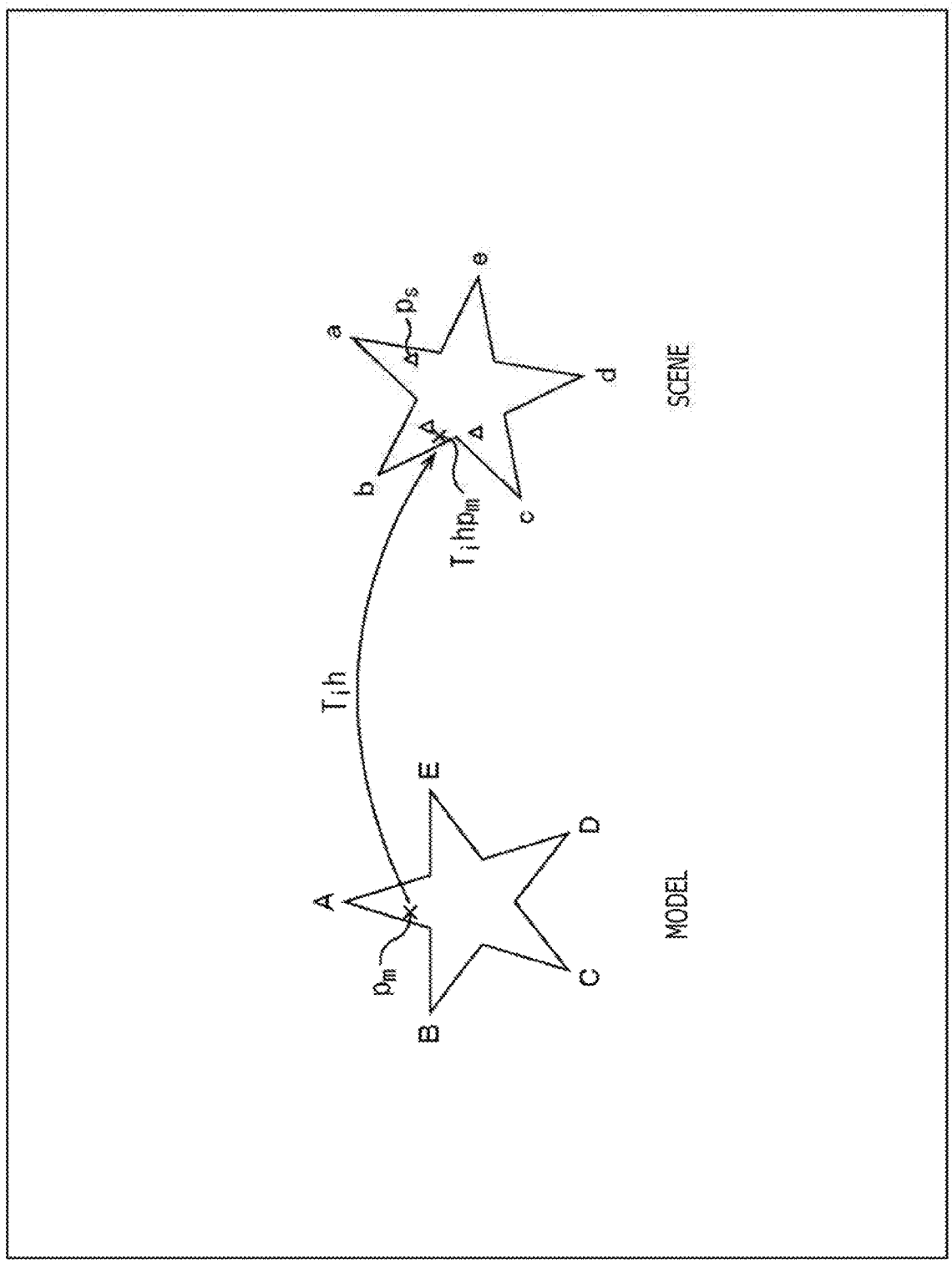
FIG. 14 is a diagram illustrating an example of computation of an established value.

FIG. 14 is a diagram illustrating an example of computation of an established value.

In a case where the posture hypothesis h is given to a point $p_m$ on the model while taking into account the symmetry $\{T_i\}$ of the model as indicated by the solid-line arrow, the point $p_m$ on the model is represented as a point $T_i hp_m$ on the scene. The minimum distance of the distances between the point $T_i hp_m$ on the scene and a plurality of points $p_s$ as corresponding points is compared with the threshold value $\sigma$, thereby providing an established value.

On the other hand, in a case where the symmetry of the model is taken into account in posture clustering, the above equation (6) that defines the degree of similarity $l(h_1, h_2)$ is changed to the equation (8) below.

[Math. 8]

$$l'(h_1, h_2) = \max_{T_i} l(T_i h_1, h_2) \qquad (8)$$

In the equation (8), the symmetry $\{T_i\}$ of the model is used in establishing a posture hypothesis $h_1$. The maximum value of the degrees of similarity between posture hypotheses $T_i h_1$ using the symmetry $\{T_i\}$ of the model and a posture hypothesis $h_2$ is calculated as a degree of similarity $l'(T_i h_1, h_2)$.

Figure 15:
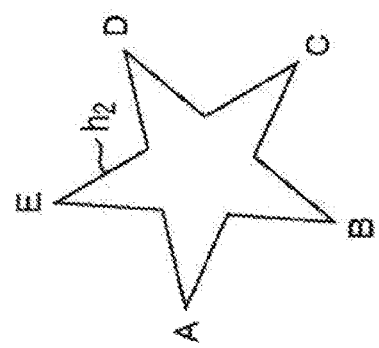
FIG. 15 is a diagram illustrating an example of computation of the degree of similarity of a posture hypothesis.
Figure 15:
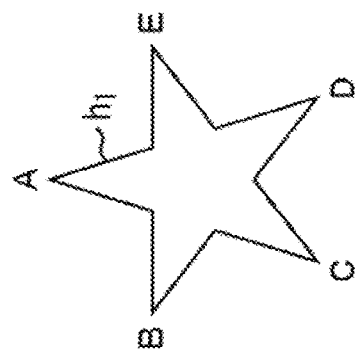

FIG. 15 is a diagram illustrating an example of computation of the degree of similarity of a posture hypothesis.

For example, the case in which a posture hypothesis $h_1$ illustrated in a left side of FIG. 15 and a posture hypothesis $h_2$ illustrated in a right side of FIG. 15 are acquired is considered. In this case, since the model M has symmetry, both posture hypotheses are considered to be essentially equivalent to each other. The degree of similarity $l(h_1, h_2)$ between the posture hypothesis $h_1$ and the posture hypothesis $h_2$ should desirably be determined as a value of 1.

However, according to the computation of the degree of similarity represented by the above equation (6), the degree of similarity $l(h_1, h_2)$ between the posture hypothesis $h_1$ and the posture hypothesis $h_2$ is determined as a value of 0. This is because the values of the rotational components of the posture hypothesis $h_1$ and the posture hypothesis $h_2$ are largely different from each other.

Figure 16:
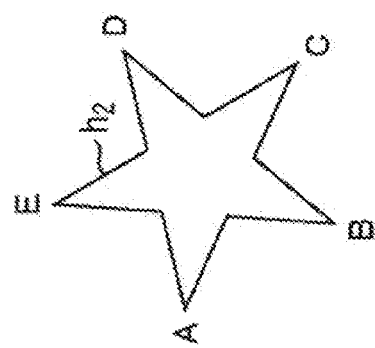
FIG. 16 is a diagram illustrating an example of computation of the degree of similarity of a posture hypothesis.
Figure 16:
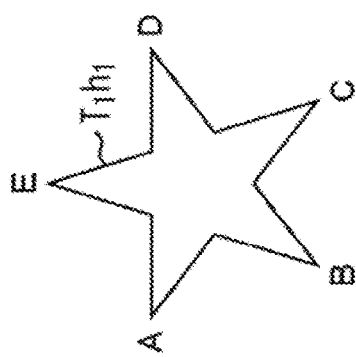
Figure 17:
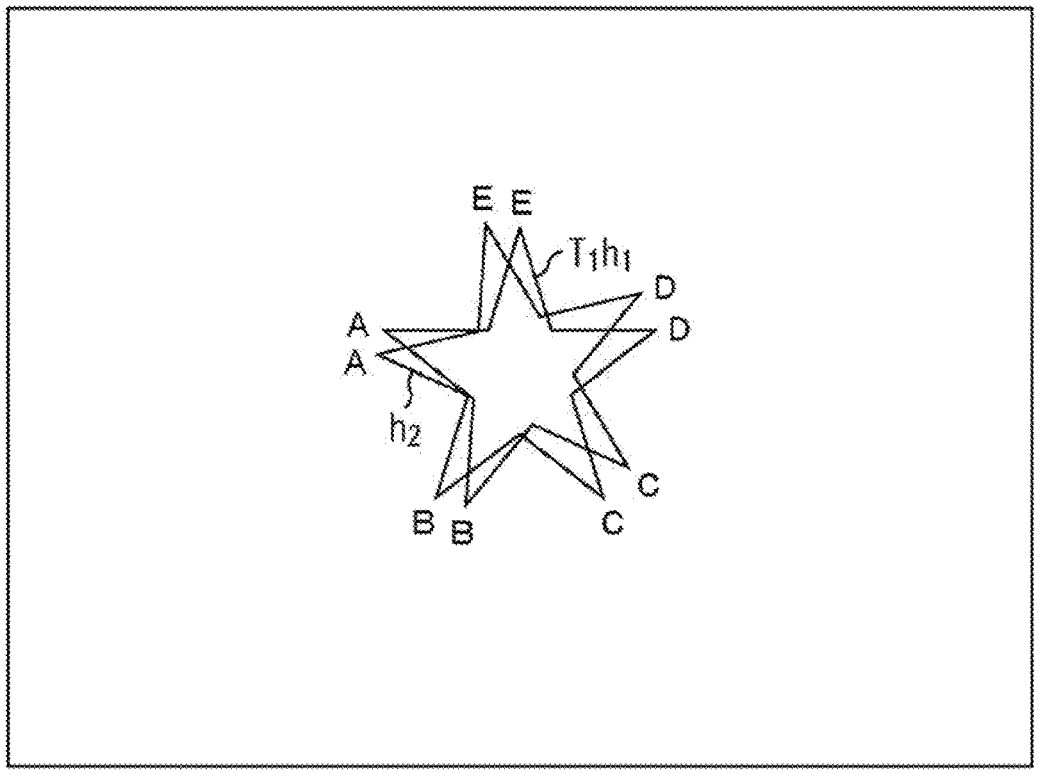
FIG. 17 is a diagram illustrating an example of computation of the degree of similarity of a posture hypothesis.

On the other hand, according to the computation of the degree of similarity represented by the above equation (8) that takes into account the symmetry $\{T_i\}$ of the model, the degree of similarity $l'(h_1, h_2)$ between the posture hypothesis $h_1$ and the posture hypothesis $h_2$ is determined as a value of 1. This is because in a case where the coordinate transformation $T_1$ (a coordinate transformation for shifting the vertex A to the vertex B) is performed on the posture hypothesis $h_1$, the model of the posture hypothesis $h_1$ is converted to the posture illustrated in a left side of FIG. 16, and the value of the converted posture hypothesis $T_1 h_1$ and the value of the posture hypothesis $h_2$ are close to each other. In a case where the posture hypothesis $T_1 h_1$ and the posture hypothesis $h_2$ are overlappingly illustrated, the two posture hypotheses are related to each other as illustrated in FIG. 17.

As a result, it is possible to group the two posture hypotheses $h_1$ and $h_2$ that are essentially similar to each other though their values are different, making it possible to increase the robustness of the final posture prediction.

The model posture predicting section 73 selects one posture hypothesis as a final posture according to RANSAC taking into account the symmetry of the model or posture clustering, and outputs the selected posture hypothesis as the result of the prediction.

Operation of the Control Apparatus

Operation of the control apparatus 1 that has the configuration described above will be described herein below.

First, a learning process that represents a process for generating a dictionary will be described below with reference to a flowchart illustrated in FIG. 18.

Figure 18:
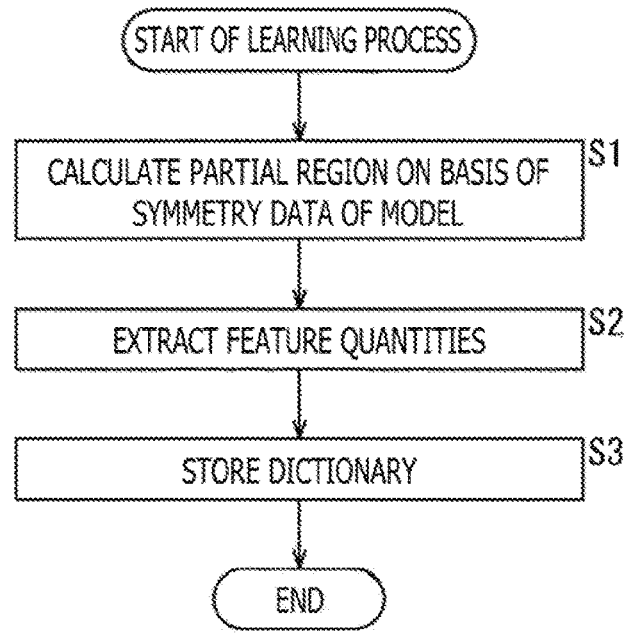
FIG. 18 is a flowchart of a learning process.

The learning process illustrated in FIG. 18 is started when the data regarding the texture and shape of the model and the data regarding the symmetry of the model are input, for example.

In step S1, the feature quantity extracting region calculating section 62 refers to the data regarding the symmetry of the model and calculates a partial region $S_0$ as a target where feature quantities are to be extracted. Here, a partial region $S_0$ that satisfies the condition of the equation (1) and the condition of the equation (2) is established, as described above.

In step S2, the feature quantity extracting section 63 extracts feature quantities in the partial region $S_0$.

In step S3, the dictionary storage section 64 stores the data of the feature quantities of the partial region $S_0$ in a dictionary. Then, the processing is ended.

Next, a predicting process that represents a process for predicting the posture of the model included in the scene will be described below with reference to a flowchart illustrated in FIG. 19.

Figure 19:
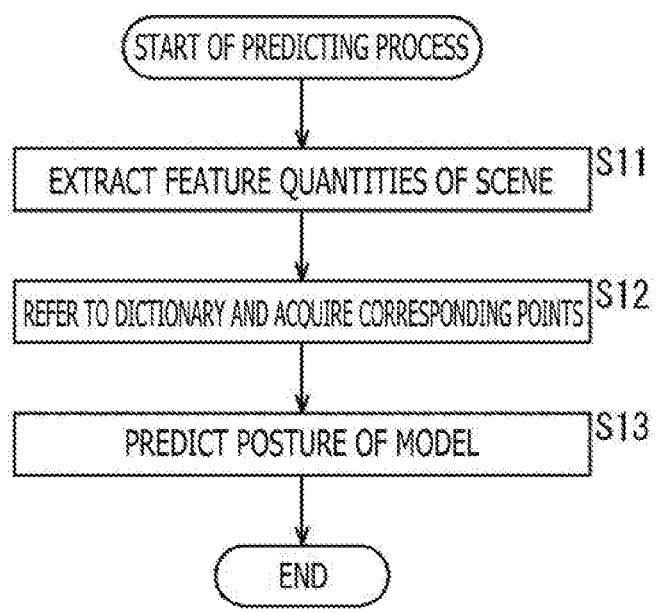
FIG. 19 is a flowchart of a predicting process.

The predicting process illustrated in FIG. 19 is started when the data of the scene are input.

In step S11, the feature quantity extracting section 71 extracts feature quantities of the entire scene.

In step S12, the corresponding point acquiring section 72 refers to the dictionary stored in the dictionary storage section 64 and performs matching between the feature quantities of the partial region $S_0$ and the feature quantities of the entire scene, thereby acquiring points on the model included in the scene that correspond to points on the model as corresponding points.

In step S13, the model posture predicting section 73 performs RANSAC or posture clustering taking into account the symmetry of the model, thereby selecting one posture hypothesis as a final posture, and outputting the final posture as the result of the prediction.

On the basis of the posture of the object predicted by the captured image processing section 31 as described above, correction of the projection image etc. is carried out by the projection image processing section 32.

By limiting a region where feature quantities are to be extracted at the time of learning is limited to the partial region $S_0$ as described above, it is possible to speed up the computation for acquiring corresponding points.

Furthermore, by predicting a posture while taking into account the symmetry of the object, a plurality of posture hypotheses that are essentially similar can be handled as equivalent posture hypotheses. It is thus possible to increase the robustness of the final posture prediction.

Moreover, inasmuch as the symmetry of the model as a target to be processed by the control apparatus 1 is optional, it is possible to predict the posture of not only rotational bodies, but also objects having any symmetry.

<2-2. Example Using Machine Learning>

Figure 20:
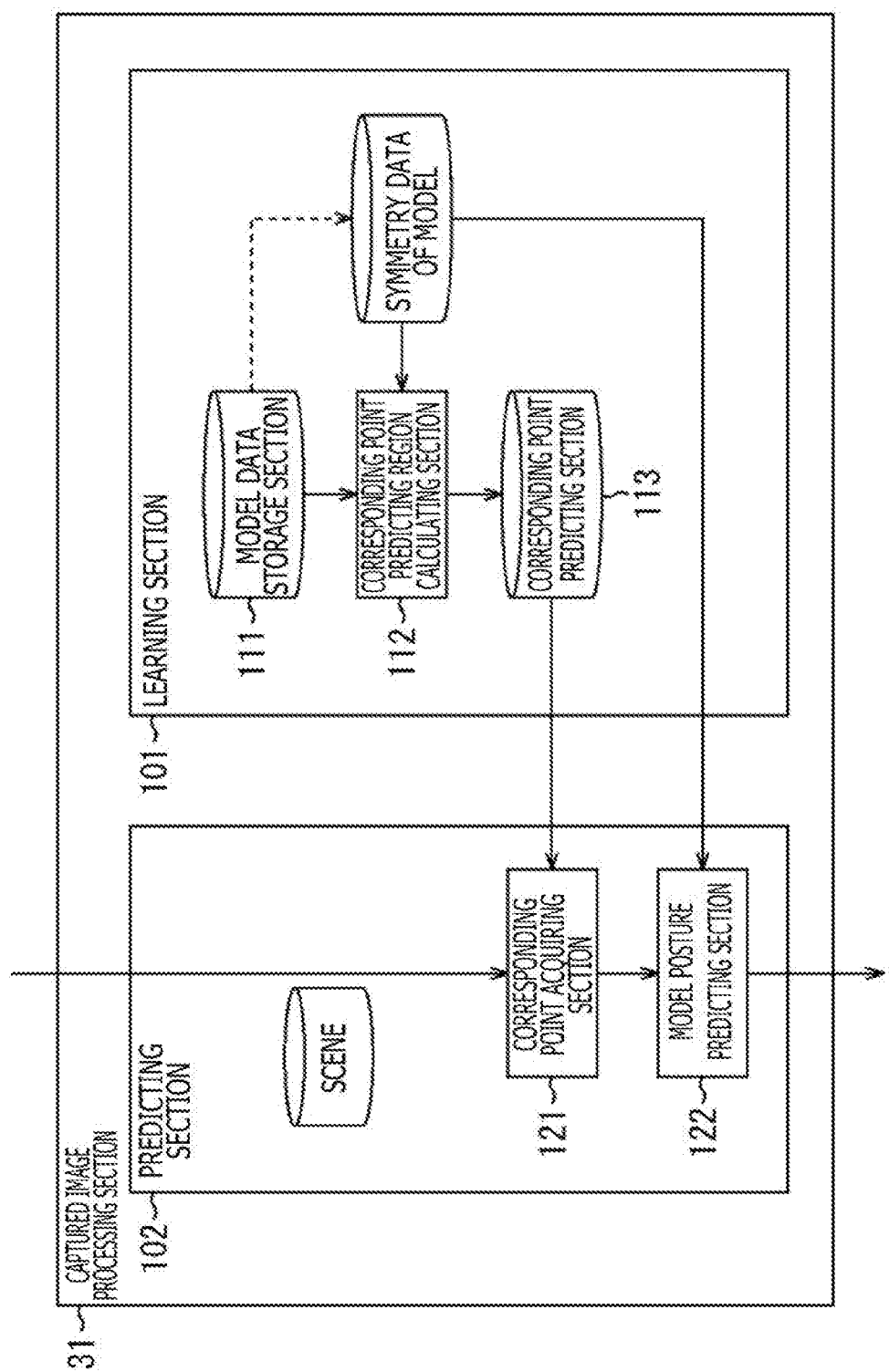
FIG. 20 is a block diagram illustrating another configurational example of a captured image processing section.

FIG. 20 is a block diagram illustrating another configurational example of the captured image processing section 31.

The captured image processing section 31 illustrated in FIG. 20 generates a posture predictor by performing machine learning. Furthermore, a posture is predicted using the posture predictor generated by machine learning. The learning of the posture predictor and the prediction of a posture using the posture predictor are carried out taking into account the symmetry of the model. Any description similar to the above description will be appropriately omitted below.

As illustrated in FIG. 20, the captured image processing section 31 includes a learning section 101 and a predicting section 102.

The learning section 101 functions as a generator that performs machine learning based on the data of a model and generates a predictor used in acquiring corresponding points. The learning section 101 includes a model data storage section 111, a corresponding point predicting region calculating section 112, and a corresponding point predictor 113.

The model data storage section 111 stores the data of the model. The data of the model stored by the model data storage section 111 include data regarding the texture and shape of the model and data regarding the symmetry of the model. As pointed by the tip of the broken-line arrow, the data regarding the symmetry of the model is supplied to the corresponding point predicting region calculating section. 112 at the time of learning and also supplied to a model posture predicting section 122 of the predicting section 102 at the time of posture prediction.

The corresponding point predicting region calculating section 112 calculates a partial region $S_0$ that represents the region of a portion of the entire surface of the model, as with the feature quantity extracting region calculating section 62 illustrated in FIG. 7. The partial region $S_0$ serves as a region where corresponding points are predicted. The corresponding point predicting region calculating section 112 establishes the partial region $S_0$ that satisfies the condition of the above equation (1) and the condition of the above equation (2).

The corresponding point predicting region calculating section 112 performs machine learning using the data of the partial region $S_0$ of the entire model, generating the corresponding point predictor 113. Information regarding corresponding points is also used appropriately in generating the corresponding point predictor 113.

The corresponding point predictor 113 generated by machine learning using the data of the partial region $S_0$ represents a predictor that outputs corresponding points when a scene is input. The corresponding point predictor 113 is configured as a predictor of Random Forest, a predictor of Random Ferns, or a neural network, for example.

The predicting section 102 acquires corresponding points using the corresponding point predictor 113 obtained from the machine learning performed by the learning section 101 and predicts the posture of the model included in the scene. The predicting section. 102 includes a corresponding point acquiring section 121 and the model posture predicting section 122.

The corresponding point acquiring section 121 inputs the scene to the corresponding point predictor 113 and acquires corresponding points output from the corresponding point predictor 113 information of the corresponding points acquired using the corresponding point predictor 113 is supplied to the model posture predicting section 122.

The model posture predicting section 122 establishes posture hypotheses as candidates for the posture of the model included in the scene on the basis of the corresponding points acquired by the corresponding point acquiring section 121, as with the model posture predicting section 73 illustrated in FIG. 7.

Furthermore, the model posture predicting section 122 selects one of the posture hypotheses as a final posture according to RANSAC taking into account the symmetry of the model or posture clustering, and outputs the selected posture hypothesis as the result of the prediction.

Operation of the Control Apparatus

Operation of the control apparatus 1 that has the configuration illustrated in FIG. 20 will be described herein below.

Figure 21:
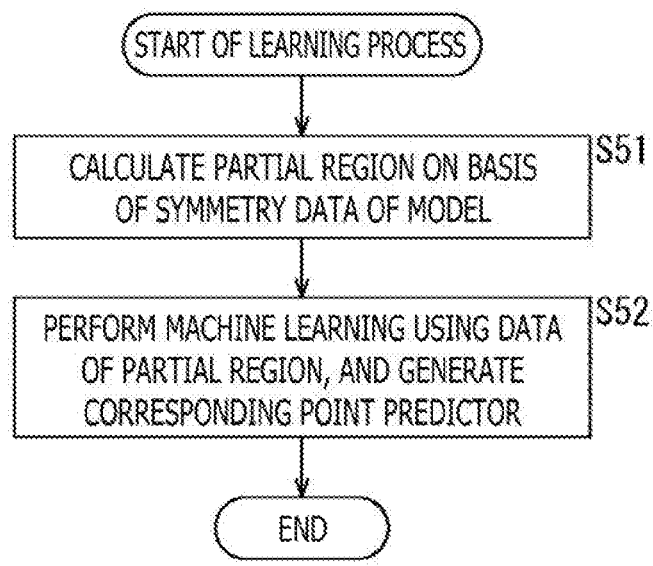
FIG. 21 is a flowchart of a learning process.

First, a learning process that represents a process for generating a posture predictor will be described below with reference to a flowchart illustrated in FIG. 21.

In step S51, the corresponding point predicting region calculating section 112 refers to the data regarding the symmetry of the model and calculates a partial region $S_0$. Here, a partial region $S_0$ that satisfies the condition of the equation (1) and the condition of the equation (2) is established, as described above.

In step S52, the corresponding point predicting region calculating section 112 performs machine learning using the data of the partial region $S_0$ of the entire model, generating the corresponding point predictor 113.

Figure 22:
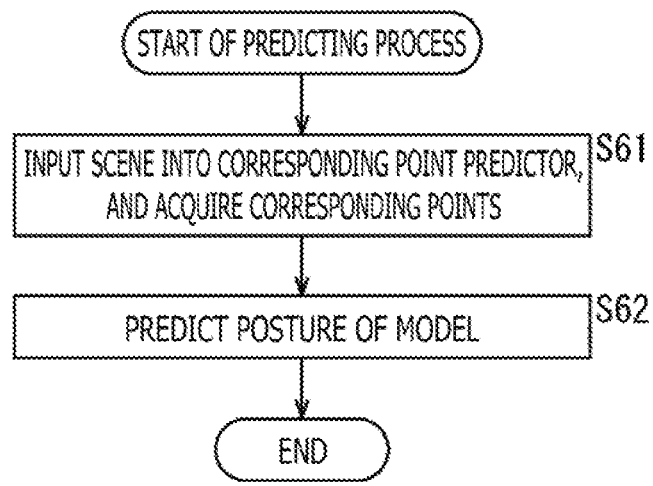
FIG. 22 is a flowchart of a predicting process.

Next, a predicting process that represents a process for predicting the posture of the model included in the scene will be described below with reference to a flowchart illustrated in FIG. 22.

In step S61, the corresponding point acquiring section 121 inputs the scene to the corresponding point predictor 113 and acquires corresponding points output from the corresponding point predictor 113.

In step S62, the model posture predicting section 122 selects one posture hypothesis as a final posture according to RANSAC taking into account the symmetry of the model or posture clustering, and outputs the selected posture hypothesis as the result of the prediction.

On the basis of the posture of the object predicted by the captured image processing section 31 as described above, correction of the projection image etc. is carried out by the projection image processing section 32.

By limiting a region that is used in machine learning to the partial region $S_0$ as described above, it is possible to speed up the computation of the predictor.

<<3. Modifications>>

In the example illustrated in FIG. 7, the learning section 51 for the learning of a dictionary and the predicting section 52 for predicting a posture using the dictionary are realized by one apparatus. However, they may be realized respectively by a different apparatus. In this case, the dictionary generated in the apparatus having the learning section 51 is supplied to the apparatus having the predicting section 52, and used in predicting a posture.

In the example illustrated in FIG. 20, the learning section 101 for the machine learning of a posture predictor and the predicting section 102 for predicting a posture using the posture predictor are realized by one apparatus. However, they may be realized respectively by a different apparatus. In this case, the posture predictor generated in the apparatus having the learning section 101 is supplied to the apparatus having the predicting section 102, and used in predicting a posture.

The control apparatus 1 is prepared as an apparatus in a housing separate from a projector. However, the above function of the control apparatus 1 may be incorporated in either one of a plurality of projectors.

Each of a plurality of projectors and the control apparatus 1 are connected through wired or wireless communication. However, they may be connected through the Internet.

The prediction of the posture of an object having symmetry as described above is applicable to systems other than the projection system described with reference to FIG. 1. For example, the above technology of posture prediction may be used with augmented reality (AR) and virtual reality (VR) for displaying contents on the basis of a predicted posture, gripping an object with a robot, and the like.

Configurational Example of Computer

The processing sequences described in the above description can be implemented by hardware or software. In a case where the processing sequences are implemented by software, programs of the software are installed from a program recording medium into a computer assembled in dedicated hardware, a general-purpose personal computer, or the like.

Figure 23:
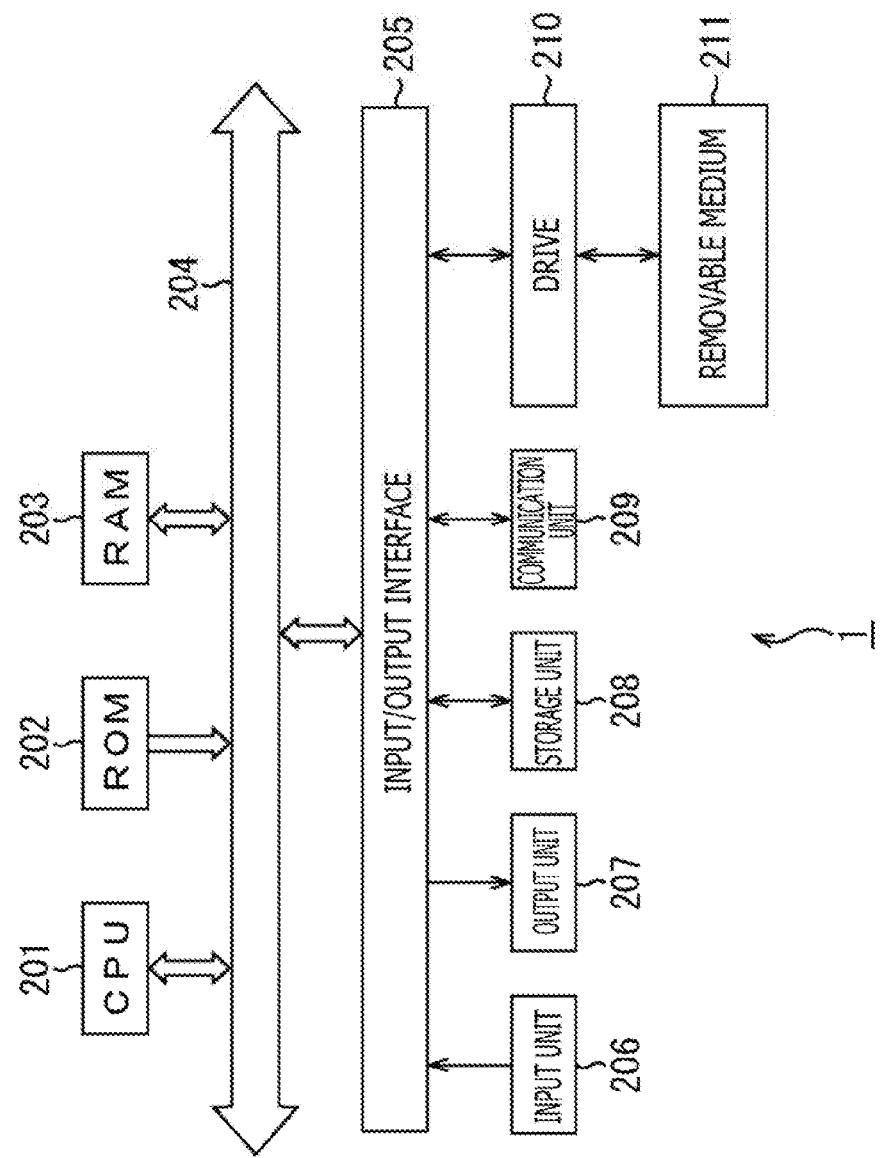
FIG. 23 is a block diagram illustrating a configurational example of a computer.

FIG. 23 is a block diagram illustrating a configurational example of the hardware of a computer that performs the above processing sequences according to Programs.

For example, the control apparatus 1 is realized by a computer having the configuration illustrated in FIG. 23.

A CPU (Central Processing Unit) 201, a ROM (Read Only Memory) 202, and a RAM (Random Access Memory) 203 are interconnected by a bus 204.

To the bus 204, there is further connected an input/output interface 205. To the input/output interface 205, there are connected an input unit 206 including a keyboard, a mouse, etc., and an output unit 207 including a display, a speaker, etc. To the input/output interface 205, there are also connected a storage unit 208 including a hard disk, a nonvolatile memory, etc., a communication unit 209 including a network interface etc., and a drive 210 for driving a removable medium 211.

In the computer thus configured, the CPU 201 loads programs stored in the storage unit 208, for example, through the input/output interface 205 and the bus 204 into the RAM 203 and executes the programs, thereby performing the above processing sequences.

The programs executed by the CPU 201 are recorded in the removable medium 211, for example, or provided through a wired or wireless transmission medium such as a local area network, the Internet, or digital broadcasts, and are installed in the storage unit 208.

The programs executed by the computer may be programs to be processed in a chronological order according to the sequences described in the present description or programs to be processed concurrently or at necessary timings such as when called up.

In the present description, a system means a set of a plurality of components (apparatuses, modules (parts), etc.), and it does not matter whether all the components are housed in one housing or not. Therefore, a plurality of apparatuses housed in separate housings and interconnected through a network, and a single apparatus having a plurality of modules housed in a single housing are all referred to as a system.

The present technology is not limited to the embodiment described above, but many changes and modifications may be made therein without departing from the scope of the present technology.

For example, the present technology may be configured as a cloud computing system in which one function is shared by and processed in collaboration with a plurality of apparatuses via a network.

Each of the steps described in the above flowcharts can be executed by a single apparatus or a plurality of apparatuses operating in collaboration with each other.

Furthermore, in a case where a single step includes a plurality of processing sequences, the processing sequences included in the single step can be executed by a single apparatus or a plurality of apparatuses operating in collaboration with each other.

The advantages referred to in the above description are not restrictive, but illustrative only, and do not preclude other advantages.

An Example of Combinations of Arrangements

The present technology can have arrangements described below.

(1)

An information processing apparatus including:

a corresponding point acquiring section that specifies, on the basis of learned data used in specifying corresponding points, obtained by performing learning using data of a predetermined portion that has symmetry with respect to other portions of as entire model that represents an object as a recognition target, second points on the model included in an input scene that correspond to first points on the model, as the corresponding points; and a posture predicting section that predicts a posture of the model included in the scene on the basis of the corresponding points.

(2)

The information processing apparatus according to (1), in which the predetermined portion includes a portion established such that in a case where the predetermined portion is shifted to respective positions of a plurality of the other portions that have symmetry in terms of at least either one of texture or shape, the predetermined portion does not have a region overlapping any of the plurality of the other portions.

(3)

The information processing apparatus according to (2), in which the predetermined portion includes a portion established such that in a case where the predetermined portion is shifted to respective positions of a plurality of the other portions that have symmetry a union of the shifted portions corresponds to the entire model.

(4)

The information processing apparatus according to (3), further including:

a feature quantity extracting section that extracts feature quantities of the predetermined portion, in which the corresponding point acquiring section specifies the corresponding points on the basis of a dictionary as the learned data including data of the feature quantities at each point of the predetermined portion.

(5)

The information processing apparatus according to (4), further including:

a dictionary storing section that stores the dictionary.

(6)

The information processing apparatus according to (3), in which the corresponding point acquiring section specifies the corresponding points on a basis of a predictor as the learned data that is obtained by performing machine learning using the data of the predetermined portion and information regarding the corresponding points.

(7)

The information processing apparatus according to any one of (3) through (6), in which the posture predicting section predicts, as the posture of the model included in the scene, a predetermined posture hypothesis among a plurality of posture hypotheses specified on the basis of a relationship between the first point and the second point, by using RANSAC.

(8)

The information processing apparatus according to (7), is which the posture predicting section predicts the posture of the model included in the scene on the basis of reliability of each of the posture hypotheses that is calculated on the basis of a distance between the first point transformed when a transformation corresponding to a coordinate transformation for shifting the predetermined portion to the position of each of the plurality of the other portions that have symmetry is performed on the first point, and the second point.

(9)

The information processing apparatus according to (8), in which the posture predicting section calculates the reliability by calculating the distance between the first point transformed that is closest to the second point, among a plurality of the first points transformed when transformations corresponding to a plurality of the coordinate transformations are performed on the first point, and the second point, with respect to a plurality of the second points.

(10)

The information processing apparatus according to any one of (3) through (6), in which the posture predicting section predicts the posture of the model included in the scene by performing clustering of a plurality of posture hypotheses identified on the basis of a relationship between the first point and the second point, using a degree of similarity between the posture hypotheses as an index.

(11)

The information processing apparatus according to (10), in which the posture predicting section performs a transformation corresponding to a coordinate transformation for shifting the predetermined portion to the position of each of the plurality of the other portions that have symmetry on a predetermined posture hypothesis among a plurality of the posture hypotheses between which the degree of similarity is to be determined, and calculates the degree of similarity between the transformed posture hypothesis and the other posture hypotheses.

(12)

An information processing method in which an information processing apparatus:

specifies, on the basis of learned data used in specifying corresponding points, obtained by performing learning using data of a predetermined portion that has symmetry with respect to other portions of an entire model that represents an object as a recognition target, second points on the model included in an input scene that correspond to first points on the model, as the corresponding points, and predicts a posture of the model included in the scene on the basis of the corresponding points.

(13)

A program for causing a computer to perform a processing sequence to:

specify, on the basis of learned data used in specifying corresponding points, obtained by performing learning using data of a predetermined portion that has symmetry with respect to other portions of an entire model that represents an object as a recognition target, second points on the model included in an input scene that correspond to first points on the model, as the corresponding points, and predict the posture of the model included in the scene on the basis of the corresponding points.

(14)

An information processing apparatus including:

a generator that generates, when a posture of a model included in an input scene is to be predicted by performing learning using data of a predetermined portion that has symmetry with respect to other portions of the entire model that represents an object as a recognition target, the learned data used in specifying second points on the model included in the scene that correspond to first points on the model, as corresponding points.

(15)

The information processing apparatus according to (14), further including:

a region calculating section that establishes the predetermined portion so as not to have a region overlapping any of the other portions in a case where the predetermined portion is shifted to respective positions of a plurality of the other portions that have symmetry in terms of at least either one of texture or shape.

(16)

The information processing apparatus according to (15), in which the region calculating section establishes the predetermined portion such that in a case where the predetermined portion is shifted to respective positions of a plurality of the other portions that have symmetry, a union of shifted portions corresponds to the entire model.

(17)

An information processing method in which an information processing apparatus:

generates, when a posture of a model included in a scene is to be predicted by performing learning using data of a predetermined portion that has symmetry with respect to other portions of the entire model that represents an object as a recognition target, the learned data used in specifying second points on the model included in the scene that correspond to first points on the model, as corresponding points.

(17)

A program for causing a computer to perform a processing sequence to generate, when a posture of a model included in a scene is to be predicted by performing learning using data of a predetermined portion that has symmetry with respect to other portions of the entire model that represents an object as a recognition target, the learned data used in specifying second points on the model included in the scene that correspond to first points on the model, as corresponding points.

REFERENCE SIGNS LIST

1 Control apparatus, 31 Captured image processing section, 32 Projection image processing section, 51 Learning section, 52 Predicting section, 61 Model data storage section, 62 Feature quantity extracting region calculating section, 63 Feature quantity extracting section, 64 Dictionary storage section, 71 Feature quantity extracting section, 72 Corresponding point acquiring section, 73 Model posture predicting section, 101 Learning section, 102 Predicting section, 111 Model data storage section, 112 Corresponding point predicting region calculating section, 113 Corresponding point predictor, 121 Corresponding point acquiring section, 122 Model posture predicting section.

The invention claimed is:

1. An information processing apparatus comprising:
a corresponding point acquiring section configured to specify, on a basis of learned data used in specifying corresponding points, obtained by performing learning using data of a predetermined portion of a plurality of portions of an entire model that represents an object as a recognition target, second points on the model included in a scene that correspond to first points on the model, as the corresponding points; and
a posture predicting section configured to predict a posture of the model included in the scene on a basis of the corresponding points,
wherein the predetermined portion has symmetry with respect to other portions of the plurality of portions,
wherein the predetermined portion includes a portion established such that in a case where the predetermined portion is shifted to respective positions of the other portions that have symmetry, a union of the shifted portions corresponds to the entire model, and
wherein the corresponding point acquiring section and the posture predicting section are each implemented via at least one processor.

2. The information processing apparatus according to claim 1, wherein the predetermined portion includes a portion established such that in a case where the predetermined portion is shifted to respective positions of a plurality of the other portions that have symmetry in terms of at least either one of texture or shape, the predetermined portion does not have a region overlapping any of the plurality of the other portions.

3. The information processing apparatus according to claim 1, further comprising:
a feature quantity extracting section configured to extract feature quantities of the predetermined portion,
wherein the corresponding point acquiring section is further configured to specify the corresponding points on a basis of a dictionary as the learned data including data of the feature quantities at each point of the predetermined portion, and
wherein the feature quantity extracting section is implemented via at least one processor.

4. The information processing apparatus according to claim 3, further comprising:
a dictionary storing section configured to store the dictionary,
wherein the dictionary storing section is implemented via at least one processor.

5. The information processing apparatus according to claim 1, wherein the corresponding point acquiring section is further configured to specify the corresponding points on a basis of a predictor as the learned data that is obtained by performing machine learning using the data of the predetermined portion and information regarding the corresponding points.

6. The information processing apparatus according to claim 1, wherein the posture predicting section is further configured to predict, as the posture of the model included in the scene, a predetermined posture hypothesis among a plurality of posture hypotheses specified on a basis of a relationship between the first point and the second point, by using Random Sampling Consensus (RANSAC).

7. The information processing apparatus according to claim 6, wherein the posture predicting section is further configured to predict the posture of the model included in the scene on a basis of reliability of each of the posture hypotheses that is calculated on a basis of a distance between the first point transformed when a transformation corresponding to a coordinate transformation for shifting the predetermined portion to the position of each of the plurality of the other portions that have symmetry is performed on the first point, and the second point.

8. The information processing apparatus according to claim 7, wherein the posture predicting section is further configured to calculate the reliability by calculating the distance between the first point transformed that is closest to the second point, among a plurality of the first points transformed when transformations corresponding to a plurality of the coordinate transformations are performed on the first point, and the second point, with respect to a plurality of the second points.

9. The information processing apparatus according to claim 1, wherein the posture predicting section is further configured to predict the posture of the model included in the scene by performing clustering of a plurality of posture hypotheses identified on a basis of a relationship between the first point and the second point, using a degree of similarity between the posture hypotheses as an index.

10. The information processing apparatus according to claim 9, wherein the posture predicting section is further configured to perform a transformation corresponding to a coordinate transformation for shifting the predetermined portion to the position of each of the plurality of the other portions that have symmetry on a predetermined posture hypothesis among a plurality of the posture hypotheses between which the degree of similarity is to be determined, and calculate the degree of similarity between the transformed posture hypothesis and other posture hypotheses of the plurality of the posture hypotheses.

11. An information processing method comprising:
specifying, on a basis of learned data used in specifying corresponding points, obtained by performing learning using data of a predetermined portion of a plurality of portions of an entire model that represents an object as a recognition target, second points on the model included in a scene that correspond to first points on the model, as the corresponding points; and
predicting a posture of the model included in the scene on a basis of the corresponding points,
wherein the predetermined portion has symmetry with respect to other portions of the plurality of portions, and
wherein the predetermined portion includes a portion established such that in a case where the predetermined portion is shifted to respective positions of the other portions that have symmetry, a union of the shifted portions corresponds to the entire model.

12. A non-transitory computer-readable medium having embodied thereon a program, which when executed by a computer causes the computer to execute an information processing method, the method comprising:
specifying, on a basis of learned data used in specifying corresponding points, obtained by performing learning using data of a predetermined portion of a plurality of portions of an entire model that represents an object as a recognition target, second points on the model included in a scene that correspond to first points on the model, as the corresponding points; and
predicting a posture of the model included in the scene on a basis of the corresponding points,
wherein the predetermined portion has symmetry with respect to other portions of the plurality of portions, and
wherein the predetermined portion includes a portion established such that in a case where the predetermined portion is shifted to respective positions of the other portions that have symmetry, a union of the shifted portions corresponds to the entire model.

13. An information processing apparatus comprising:
a generator configured to generate, when a posture of a model included in a scene is to be predicted by performing learning using data of a predetermined portion of a plurality of portions of an entire model that represents an object as a recognition target, the learned data used in specifying second points on the model included in the scene that correspond to first points on the model, as corresponding points; and
a region calculating section configured to establish the predetermined portion such that in a case where the predetermined portion is shifted to respective positions of a plurality of the other portions that have symmetry, a union of shifted portions corresponds to the entire model,
wherein the predetermined portion has symmetry with respect to other portions of the plurality of portions, and
wherein the generator and the region calculating section are each implemented via at least one processor.

14. The information processing apparatus according to claim 13,
wherein the region calculating section is further configured to establish the predetermined portion so as not to have a region overlapping any of the other portions in a case where the predetermined portion is shifted to respective positions of a plurality of the other portions that have symmetry in terms of at least either one of texture or shape.

15. An information processing method comprising:
generating, when a posture of a model included in a scene is to be predicted by performing learning using data of a predetermined portion of a plurality of portions of an entire model that represents an object as a recognition target, the learned data used in specifying second points on the model included in the scene that correspond to first points on the model, as corresponding points; and
establishing the predetermined portion such that in a case where the predetermined portion is shifted to respective positions of a plurality of the other portions that have symmetry, a union of shifted portions corresponds to the entire model,
wherein the predetermined portion has symmetry with respect to other portions of the plurality of portions.

16. A non-transitory computer-readable medium having embodied thereon a program, which when executed by a computer causes the computer to execute an information processing method, the method comprising:
generating, when a posture of a model included in a scene is to be predicted by performing learning using data of a predetermined portion of a plurality of portions of the entire model that represents an object as a recognition target, the learned data used in specifying second points on the model included in the scene that correspond to first points on the model, as corresponding points; and
establishing the predetermined portion such that in a case where the predetermined portion is shifted to respective positions of a plurality of the other portions that have symmetry, a union of shifted portions corresponds to the entire model,
wherein the predetermined portion has symmetry with respect to other portions of the plurality of portions.

* * * * *